(12) United States Patent
Chisholm

(10) Patent No.: US 11,276,066 B2
(45) Date of Patent: *Mar. 15, 2022

(54) METHODS AND SYSTEMS FOR PROVIDING A DECISION MAKING PLATFORM

(71) Applicant: MASTERCARD INTERNATIONAL INCORPORATED, Purchase, NY (US)

(72) Inventor: John D. Chisholm, Ballwin, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 234 days.

This patent is subject to a terminal disclaimer.

(21) Appl. No.: 16/505,397

(22) Filed: Jul. 8, 2019

(65) Prior Publication Data

US 2020/0005313 A1 Jan. 2, 2020

Related U.S. Application Data

(63) Continuation of application No. 14/293,734, filed on Jun. 2, 2014, now Pat. No. 10,346,844, which is a continuation-in-part of application No. 13/364,190, filed on Feb. 1, 2012, now Pat. No. 8,744,941, which (Continued)

(51) Int. Cl.
  *G06Q 40/00* (2012.01)
  *G06Q 20/40* (2012.01)
  *G06Q 20/04* (2012.01)
  *G06Q 40/02* (2012.01)

(52) U.S. Cl.
  CPC ......... *G06Q 20/4016* (2013.01); *G06Q 20/04* (2013.01); *G06Q 20/40* (2013.01); *G06Q 40/02* (2013.01)

(58) Field of Classification Search
  None
  See application file for complete search history.

(56) References Cited

U.S. PATENT DOCUMENTS

| | | |
|---|---|---|
| 5,895,453 A | 4/1999 | Cook |
| 6,418,436 B1 | 7/2002 | Degen et al. |
| 6,853,973 B2 | 2/2005 | Mathews et al. |

(Continued)

OTHER PUBLICATIONS

Database Architecture for Data Warehousing: An Evolutionary Approach; Jose Samos, Felix Saltor, Juame Sistac, and Agusti Bardes; 1998; 11 pgs.*

(Continued)

*Primary Examiner* — Olabode Akintola
(74) *Attorney, Agent, or Firm* — Armstrong Teasdale LLP

(57) ABSTRACT

A computer-implemented method of providing enriched transaction data for a transaction requiring an authorization is provided, the transaction performed using a computer system having a processor and a memory device. The method includes storing transaction data received from an input channel, the transaction data including a transaction identifier. An execution plan is retrieved based at least in part on the transaction identifier. The transaction data is processed across an enrichment processor based on the execution plan to generate at least one fraud score for the transaction. The transaction data is enriched to include at least one of the fraud score and an enriched data object. The enriched data is transmitted to an authorizing party for authorization.

19 Claims, 15 Drawing Sheets

Related U.S. Application Data is a continuation of application No. 12/271,643, filed on Nov. 14, 2008, now Pat. No. 8,126,791.

(56) References Cited

U.S. PATENT DOCUMENTS

| | | |
|---|---|---|
| 7,004,382 B2 | 2/2006 | Sandru |
| 7,386,506 B2 | 6/2008 | Aoki et al. |
| 7,403,922 B1 | 7/2008 | Lewis et al. |
| 7,431,207 B1 | 10/2008 | Neemann et al. |
| 2002/0194503 A1 | 12/2002 | Faith et al. |
| 2007/0067297 A1 | 3/2007 | Kublickis |
| 2008/0033880 A1 | 2/2008 | Fiebiger et al. |
| 2008/0046334 A1 | 2/2008 | Lee et al. |
| 2008/0046344 A1 | 2/2008 | Myers et al. |
| 2008/0140576 A1* | 6/2008 | Lewis ............... G06Q 10/0635 705/67 |
| 2008/0243715 A1* | 10/2008 | Stellhorn ............... G06Q 20/10 705/36 R |
| 2009/0292568 A1* | 11/2009 | Khosravani ........ G06Q 10/0635 705/7.28 |
| 2012/0185500 A1* | 7/2012 | Bhogal ................. G06F 9/5027 707/769 |

OTHER PUBLICATIONS

Examiner's Requisition, dated Feb. 3, 2016, for co-pending Canadian patent application No. 2,743,605 (4 pgs.).
International Search Report and Written Opinion; PCT/US2009/063834; dated Jan. 7, 2010; 13 pages
A Supplemental EPO Search Report dated Apr. 12, 2012 for co-pending PCT patent application No. PCT/US2009/063834.

* cited by examiner

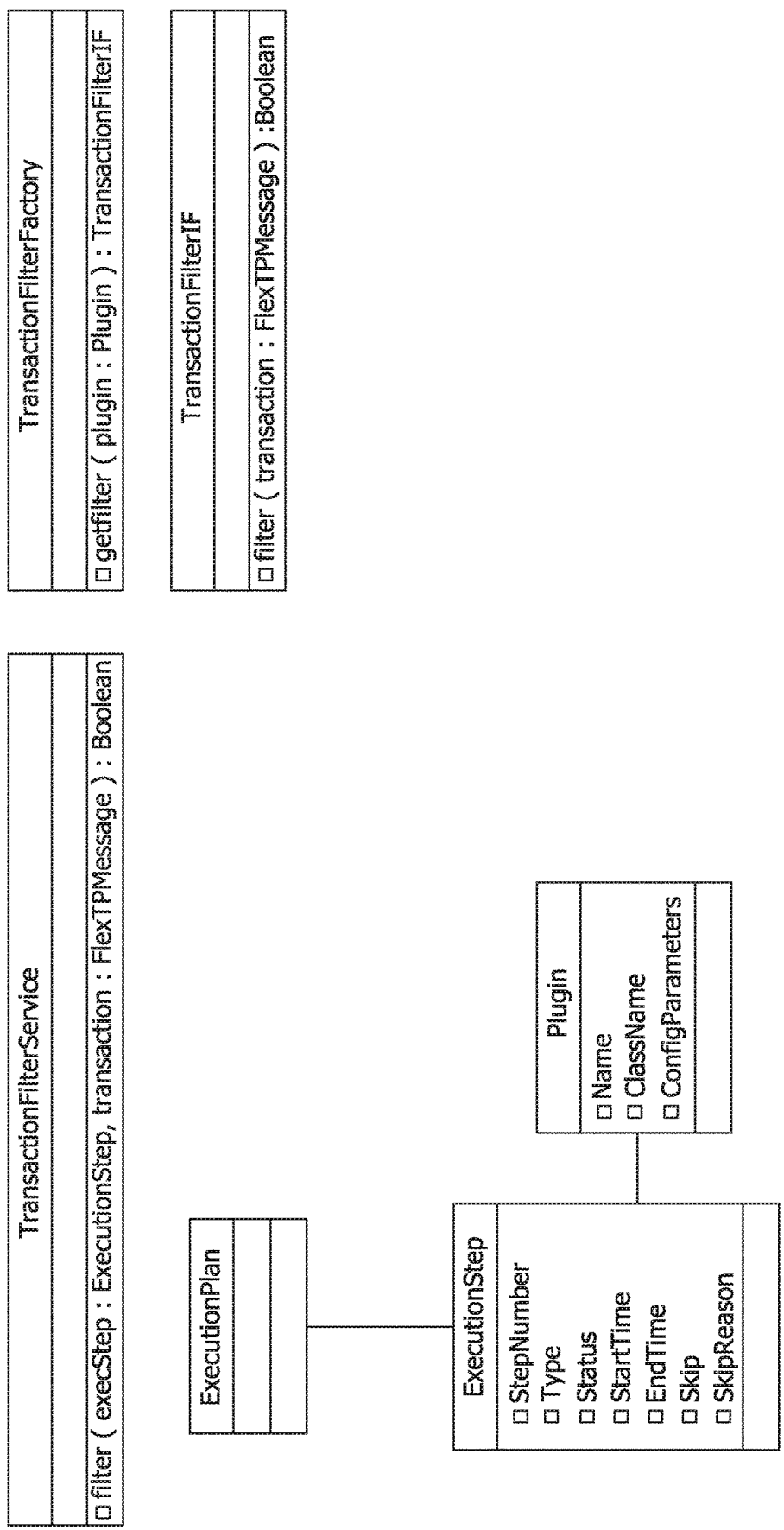

METHODS AND SYSTEMS FOR PROVIDING A DECISION MAKING PLATFORM

CROSS REFERENCE TO RELATED APPLICATIONS

This application is a continuation application of and claims priority to U.S. patent application Ser. No. 14/293,734, filed Jun. 2, 2014, which is a continuation-in-part application of and claims priority to U.S. patent application Ser. No. 13/364,190 filed on Feb. 1, 2012, and issued as U.S. Pat. No. 8,744,941 on Jun. 3, 2014, which is a continuation application of and claims priority to U.S. patent application Ser. No. 12/271,643 filed on Nov. 14, 2008, and issued as U.S. Pat. No. 8,126,791 on Feb. 28, 2012, the disclosures of which are hereby incorporated by reference in their entirety.

BACKGROUND

This invention relates generally to a method and system for providing a decision making platform for processing transactions involving financial transaction cards, and more particularly to a network-based system and method that provide a computer-related platform for decision making based on an accessibility to multiple transaction scoring engines, at least a portion of the scoring engines determining fraud risk for transactions involving financial transaction cards.

Financial transaction cards have made great gains in the United States as a means to attract financial accounts to financial institutions and, in the case of credit cards, as a medium to create small loans and generate interest income for financial institutions. Nonetheless, the financial transaction card industry is subject to certain well-known problems.

For example, at least one financial transaction card network currently provides fraud scoring for financial transaction card transactions. Fraud scoring refers to an indication, or likelihood, that a transaction is fraudulent. In one fraud scoring system, the financial transaction card network provides a number back to the financial transaction card issuer between zero and 1,000, which translates into zero and 100 percent, in tenths of percentage points. To provide fraud scoring capability, various vendors or financial transaction card companies provide and market various different fraud scoring products. A financial transaction card company generally selects one of the vendor products to provide its customers (the card issuers) with one of fraud scoring and credit risk scoring that is accessible, for example, on a financial transaction card network.

However, each of the various vendor scoring products generally provides at least one advantage when compared to other scoring products. Accordingly, a system and method is needed where a financial transaction card network can combine more than one of the above mentioned vendor fraud scoring products together to provide value added services to their customers. Further, such a system and method should be easily configurable to allow the user to easily utilize various combinations of these products. In such a system, the financial transaction card network operators should be able to easily integrate vendor products and orchestrate scoring across many of these products, combine the various scores and return those scores back to customers through a variety of output channels.

BRIEF DESCRIPTION

In one aspect, a computer-implemented method of providing enriched transaction data for a transaction requiring an authorization is provided, the transaction performed using a computer system having a processor and a memory device. The method includes storing transaction data received from an input channel, the transaction data including a transaction identifier. An execution plan is retrieved based at least in part on the transaction identifier. The transaction data is processed across an enrichment processor based on the execution plan to generate at least one fraud score for the transaction. The transaction data is enriched to include at least one of the fraud score and an enriched data object. The enriched data is transmitted to an authorizing party for authorization.

In another aspect, a computer system for providing enriched transaction data for a transaction requiring an authorization is provided. The computer system includes one or more processors communicatively coupled to one or more memory devices. The computer system is configured to store transaction data received from an input channel. The transaction data includes a transaction identifier. The computer system is also configured to retrieve at least one individual execution plan for the transaction data based at least in part on the transaction identifier and process the transaction data across an enrichment processor based on the at least one individual execution plan. The computer system is further configured to enrich the transaction data to include at least one of the at least one fraud score and an enriched data object and transmit the enriched transaction data to an authorizing party for authorizing the transaction.

In another aspect, one or more non-transitory computer-readable storage media having computer-executable instructions embodied thereon are provided. When executed by at least one processor, the computer-executable instructions cause the processor to store transaction data received from an input channel. The transaction data includes a transaction identifier. The computer-executable instructions also cause the processor to retrieve at least one individual execution plan for the transaction data based at least in part on the transaction identifier and process the transaction data across an enrichment processor based on the at least one individual execution plan. The computer-executable instructions further cause the processor to enrich the transaction data to include at least one of the at least one fraud score and an enriched data object and transmit the enriched transaction data to an authorizing party for authorizing the transaction.

BRIEF DESCRIPTION OF THE DRAWINGS

FIG. 11 is a class structure diagram illustrating the transaction filter services used by the flexible transaction processor of FIG. 6.

DETAILED DESCRIPTION

Figure 1:
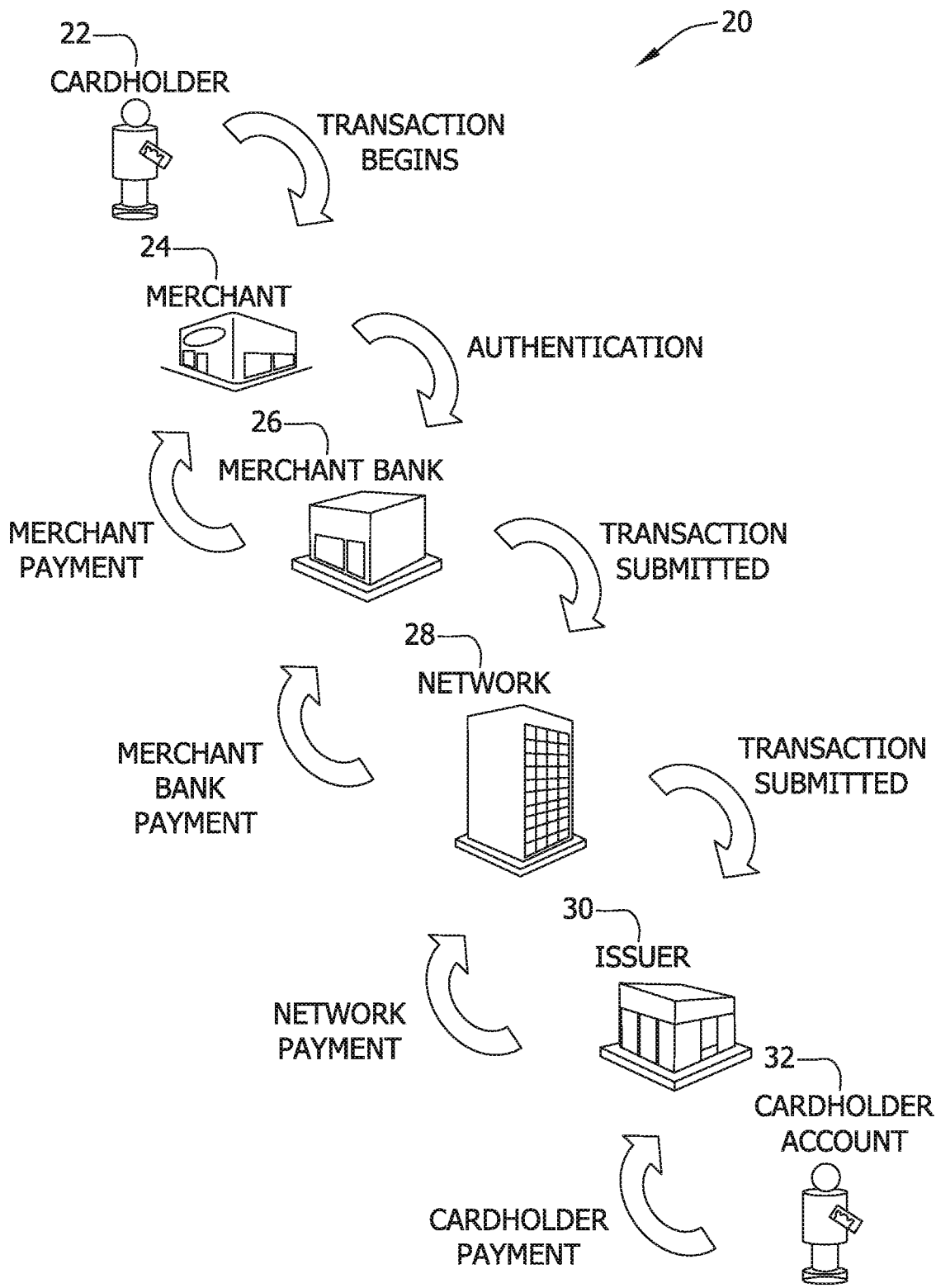
FIG. 1 is a flowchart illustrating a typical financial transaction using a financial transaction card payment system.

The described embodiments define systems and methods that provide customers superior prediction capabilities that can be readily customized to aid their decision making process in a variety of areas, for example, fraud scoring. The described embodiments are extendible to support the entire financial transaction card lifecycle including approvals, increasing card credit limits, bankruptcy, adaptive behavior control, and government compliance (e.g., with U.S government GAO). In addition, the described embodiments are further extendible to beyond financial card products to include areas such as a health care card that aids in benefits eligibility checks, patient fraud, doctor fraud, and identity takeover. The described prediction capability is achieved by partnering with various providers and utilizing both enterprise and external data sources. Such systems, and the accompanying methods, provide a single, centralized solution for decision making.

While many companies implement a single fraud scoring engine, the described decisioning system embodiments provide a highly flexible platform that facilitates scoring across multiple scoring engines. In addition, the described platform provides a plug and play type architecture with the technical effect of integrating these vendor fraud scoring products with pluggable input sources (e.g., input channels) and output delivery mechanisms. The following paragraphs describe the linking together of these various components into an overall comprehensive decisioning system, or platform. Implementation of such a system features a flexible, work flow based approach for accessing component plug-ins.

In one example, MasterCard's Authorization Service Architecture (ASA), provides for the transfer and reception of financial transaction card transaction data in real time. If the financial transaction card is used at a merchant (swiped), the transaction data is sent to the merchant's bank called the acquirer bank. In one practical example, the transaction data is then sent over Banknet® (Banknet is a registered trademark of MasterCard International Incorporated, Purchase, N.Y.) to the ASA and on to the system for scoring. Upon generation of a score, that score is sent back through the ASA and onto the financial transaction card issuer where they approve or decline the proposed transaction, taking into account the scoring provided from the financial transaction card network. Stated more simply, the issuer can take into account fraud scores, in real-time, to approve or decline transactions. The described embodiments relate to an architecture that provides a type of plug and play capability for the incorporation of multiple transaction scoring engines.

In use, the financial transaction card network receives messages containing transaction data at which point it is determined how to process the data. For example, some preprocessing might be done to enrich, transform, and filter the transaction data as described herein. Other customers (e.g., card issuers) may only want certain types of transaction scores, such as those coming from high risk merchants.

Another component of the described embodiments relates to case management. When a transaction scores high, in terms of fraud or risk, the card issuer may decide to open a case for further investigation. The described embodiments allow a user to plug in different vendor provided case management solutions. From the customer (card issuer) perspective, they are able to report or access new reporting on their data or directly access the case management system.

The described embodiments relate to making each piece of the described decisioning platform such as the input, scoring, case management, and output pluggable. Multiple plug-ins can be incorporated for the pre-processing of transaction data, for example, to provide one or more of filtering, transformation, data enrichment, etc.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In yet another embodiment, the system is run on a mainframe environment and a UNIX® server environment (UNIX is a registered trademark of AT&T, New York, N.Y.). In a further exemplary embodiment, the system is being run in a Windows® environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

FIG. 1 is a flowchart 20 illustrating a typical financial transaction using a financial transaction card payment system. The present invention is related to a financial transaction card payment system, such as a credit card payment system using the MasterCard® interchange. The MasterCard® interchange is a proprietary communications standard promulgated by MasterCard International® Incorporated for the exchange of financial transaction data between financial institutions that are members of MasterCard International Incorporated®.

In a typical financial payment system, a financial institution called the "issuer" issues a financial transaction card, such as a credit card, to a consumer, who uses the financial transaction card to tender payment for a purchase from a merchant. To accept payment with the financial transaction card, the merchant must normally establish an account with a financial institution that is part of the financial payment system. This financial institution is usually called the "merchant bank" or the "acquiring bank" or "acquirer bank." When a consumer 22 tenders payment for a purchase with a financial transaction card, the merchant 24 requests authorization from the merchant bank 26 for the amount of the purchase. The request may be performed over the telephone, but is usually performed through the use of a point-of-sale terminal, which reads the consumer's account information from the magnetic stripe on the financial transaction card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor."

Using the interchange 28, the computers of the merchant bank or the merchant processor will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge is not posted immediately to a consumer's account because bankcard associations, such as MasterCard International® Incorporated, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which are settled as a group.

Financial transaction cards or payment cards can refer to credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 2:
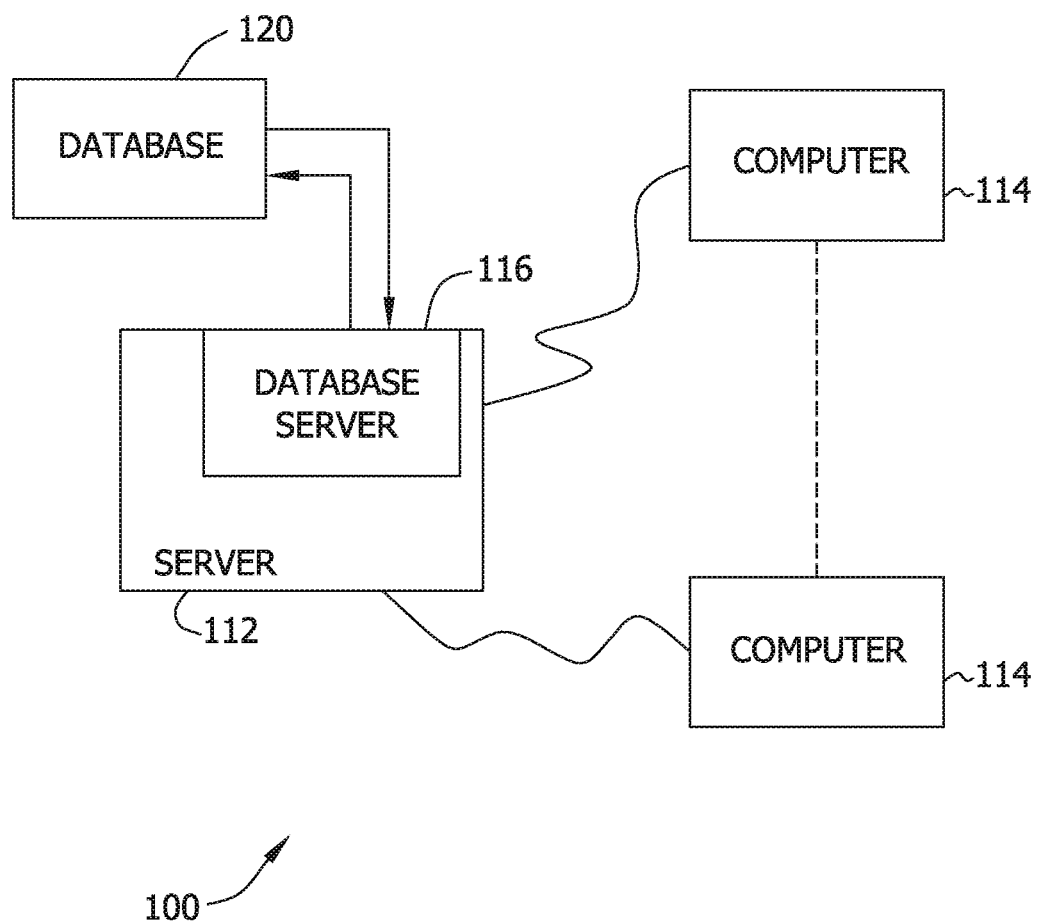
FIG. 2 is a simplified block diagram of an exemplary embodiment of a server architecture of a system in accordance with one embodiment of the present invention.

FIG. 2 is a simplified block diagram of an exemplary system 100 in accordance with one embodiment of the present invention. In one embodiment, system 100 is the financial transaction card payment system shown in FIG. 1, which can be utilized for providing a decision making platform More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment. A database server 116 is connected to a database 120 containing information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Figure 3:
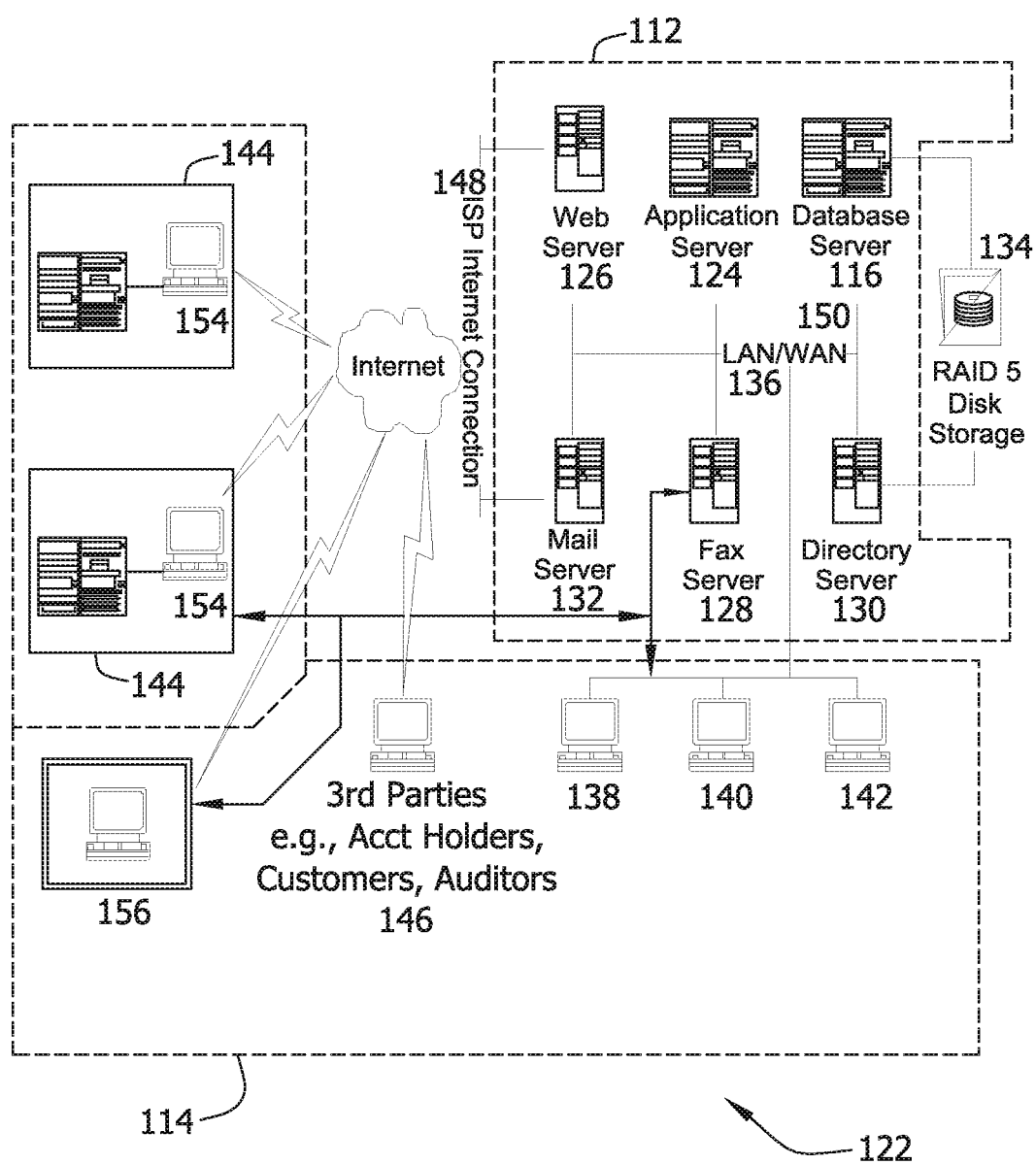
FIG. 3 is an expanded block diagram of an exemplary embodiment of a server architecture of a system in accordance with one embodiment of the present invention.

FIG. 3 is an expanded block diagram of an exemplary embodiment of a server architecture of a system 122 in accordance with one embodiment of the present invention. Components in system 122, identical to components of system 100 (shown in FIG. 2), are identified in FIG. 3 using the same reference numerals as used in FIG. 2. System 122 includes server system 112 and client systems 114. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., auditors, 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

The described embodiments provide real-time fraud prediction scoring of authorization messages from an acquirer prior to the forwarding of those messages to the transaction card issuer, and to introduce fraud management into the criteria used by a transaction card issuer when accepting or declining a transaction request. The described decisioning system and its associated methods provide an important market differentiator for a user in the area of fraud and risk management. At least one differentiator occurs in the area of real-time fraud scoring of transactions. Specifically, the decisioning system enables the use of fraud prediction information as part of the criteria used by transaction card issuers when processing transaction requests. Another differentiator occurs in the area of customization of fraud prediction models. Specifically, the decisioning provides services not currently provided in that the creation of real-time fraud prediction models customized for a specific population of fraud patterns is enabled at a greater level of granularity than those currently provided. Custom fraud prediction models are executed using embedded environment instances. These models calculate fraud prediction scores using multiple artificial intelligence and other technologies, such as neural networks, case-based reasoning system, data mining, and fuzzy logic.

Figure 4:
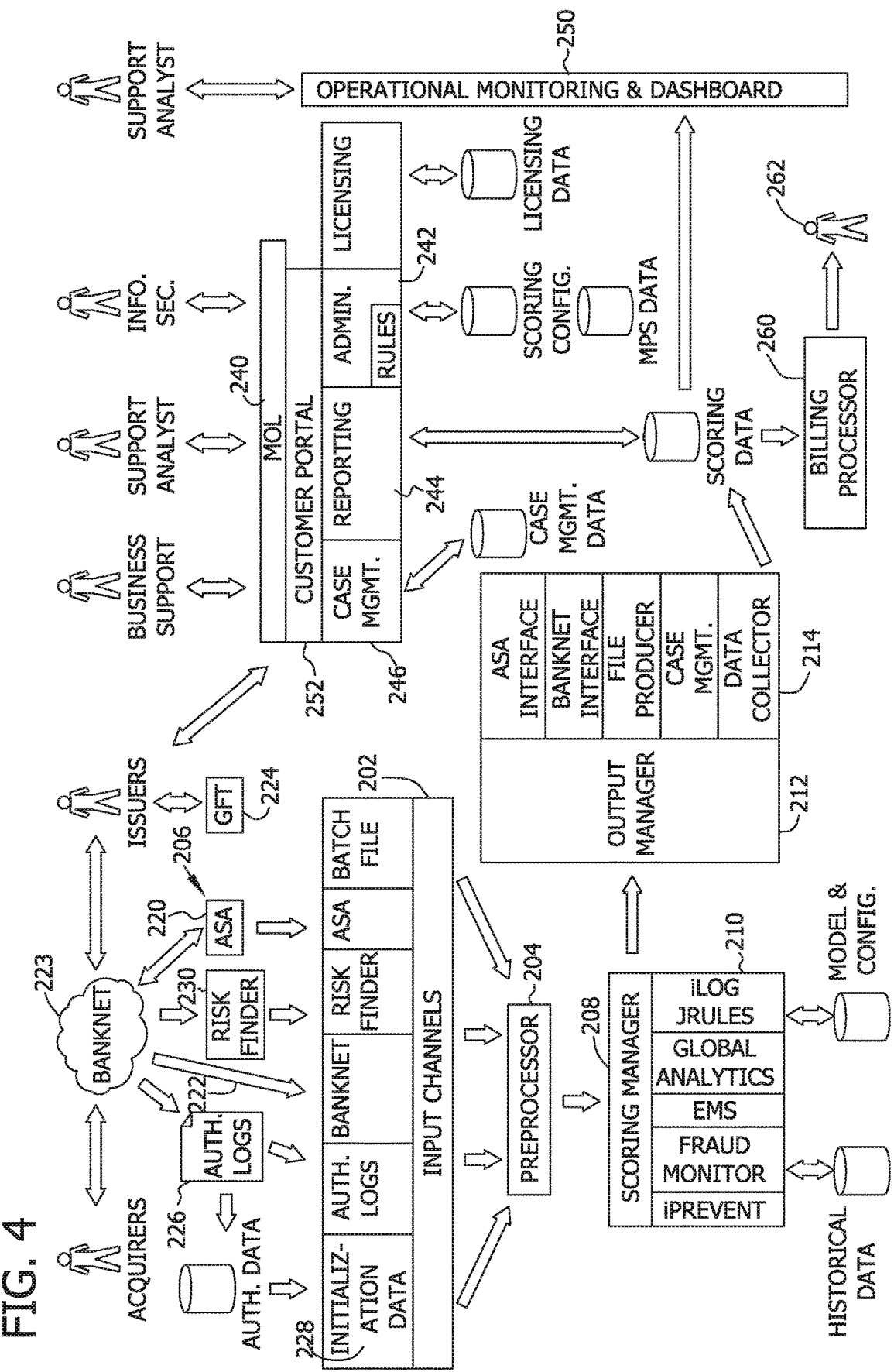
FIG. 4 is an architectural diagram of a decisioning platform in accordance with one embodiment of the present invention.

To support the above described real-time fraud prediction scoring of authorization messages from an acquirer, using multiple scoring engines, FIG. 4 is an architectural diagram of a decisioning platform 200. The decisioning platform 200, at a high level, includes a plurality of input channels 202 that provide transaction data to a preprocessor 204. In various specific embodiments, the decisioning system 200 receives input transactions 206 from a variety of input channel 202. The preprocessor 204 combines the data from the various input channels 202 and provides the combined data to a scoring manager 208. Preprocessing logic within preprocessor 204 transforms, filters, and enriches the received financial card transaction data. The transaction data is then scored by various scoring engines 210 which operate under the control of the scoring manager 208.

The resulting scored transactions are filtered by an output manager 212 and delivered to users of such data via a variety of output channels 214 in appropriate formats. Transaction processing is highly flexible since an ability to easily customize, an ability to plug in new components (e.g., input channels, output channels, transformations, filters, etc.), and an ability to plug in best of breed products are all provided via the architecture of decisioning system 200. In addition, the decisioning system 200 provides business intelligence to improve future decision making capability.

Referring again to the input channels 202, the decisioning system 200 provides for the ability to score transactions from input channels 206, several of which are described below. With respect to ASA 0100 authorization messages 220, for configured account ranges, the decisioning system 200 sends 0100 messages to be scored in real time prior to delivery to an issuer. With respect to Banknet 0120 advice messages 222, for configured customers, Banknet 223 sends 0120 scoring request messages after the authorization transaction is completed. In addition, customers may generate these 0120 messages themselves. The 0120 message contains authorization request and response data. These transactions are scored in near real time and the resulting scores are used to determine required investigations.

Customers may send batch files containing 0120 transactions to be scored via, for example, the MasterCard Global File Transfer (GFT) 224. These batch files may contain transactions that are not available on the Banknet 223. In one embodiment, two types of batch file formats are supported, including, 1014 Format and 1162 Format. 1014 Format is the same as Risk Finder in EBCDIC format, and 1162 Format is an ASCII format.

Another input channel is an authorization logs 226 input channel. For scenarios where the original transaction was sent on Banknet 223 and not scored, the system 200 uses the authorization log transactions 226 to score any previously un-scored transaction, providing the account activity "velocity counters" with a complete picture of activity. In addition, the resulting scored transactions may be provided via an output channel 214. Initialization data 228 refers to the boarding of new customers. For these customers, historical transaction data (initialization data) is fed into the system 200. This initialization data 228 is used to establish initial account usage profiles. Risk Finder 230 refers to an existing scoring system based on a single vendor scoring engine. Risk Finder transactions are sent to be scored by the system 200 to allow a scoring comparison by customers considering migrating off of the Risk Finder product.

As mentioned above, transactions from the various input channels 202 are routed to the scoring manager 208 which provides format transformation, transaction filtering, data augmentation and routing to the appropriate scoring engine. For example and referring to FIG. 4, several scoring engines are shown, including the Brighterions™ iPrevent™ scoring engine, Fraud Mark's Fraud Monitor scoring engine, EMS (MasterCard's Expert Monitoring System), Global Analytics scoring engine, and iLog™ JRules rules engine. The scoring manager 208 routes the transaction to the appropriate scoring engines 210. For each scoring engine 210, the scoring manager 208 performs the required message transformations and communicates with the engine 210 to score the transaction. For example, one scoring engine 210 uses a fraud prediction model to determine a score between 1 (least likely to be fraud) and 998 (most likely to be fraud) for the transaction. This scoring engine is initialized from a model file and a database. The fraud prediction model keeps track of account usage patterns, also called velocity, which is stored in files. In another example, scoring engine 210 uses rules to determine whether to approve or decline a transaction based on historical data stored in an in-memory data grid (shown in FIG. 13). Historical data may include, for example, a 24-hour spend level limit associated with an account. In other embodiments, historical data may include a variety of other transaction data associated with a corresponding cardholder that may be used as a potential indicator of a fraudulent or non-fraudulent transaction.

In an example embodiment, where platform 200 is used in scoring e-commerce transactions, transaction data includes device information associated with a particular cardholder device being used by a cardholder initiating a transaction. The device information is used to uniquely identify the device and may include available hardware identifiers such as system CPU information, software identifiers such as operating system versions and browser versions, and system configurations such as screen resolution and time zone configurations. The device information is captured from the device during the process of making an e-commerce purchase through a merchant web or mobile application and is sent to platform 200 where the information is used to uniquely identify a device.

In an example embodiment, scoring engines 210 use the device information in determining a fraud score for the transaction. For example, scoring engines 210 retrieve a transaction profile associated with the device and compare the transaction data for the candidate transaction (i.e., the transaction currently being evaluated by the system as potentially fraudulent) to the transaction profile associated with the device. The transaction profile may include how the device has been used in the past to initiate transactions, a number of transaction cards associated with the device, and may represent whether the device has initiated the same type of transaction request in the past, and if so, how many of those transactions were reported as fraudulent. Scoring engines 210 may also compare the transaction profile for the device to transaction profiles associated with other devices that have made similar transaction requests. The transaction data is then scored across at least one of scoring engines 210 to generate the at least one fraud score for the candidate transaction. The fraud score is generated based at least in part on the compared transaction data and transaction profile. In some embodiments, platform 200 may communicate the device information to the account issuer for making future transactions associated with the device faster and more secure.

The scored transactions are sent to the appropriate output channels 214. Examples of supported output channels 214 include, but are not limited to, ASA, Banknet, Batch Files, DataCollector, Case Management, and the Initialization and Modeling database. For the ASA output channel, scores are returned to the ASA for inclusion in the 0100 authorization request that is sent to the issuer. For the Banknet output channel, customers are sent an 0620 message containing the score for transactions scoring above a threshold. Batch files are sent to customers at a regular interval and contain the transactions scoring above a configured threshold. For the Data Collector output channel, transactions are stored to the database where they are used for various reporting and billing purposes. In addition, the data collector monitors the system Service Level Agreements (SLA) such as the time to score a transaction. For the Case Management output channel, transactions which exceed a threshold are sent to a Case Management system. In addition, transactions are stored in a database for future initialization and modeling.

Still referring to FIG. 4, a business support analyst has access to at least two MasterCard Online (MOL) web applications 240. MOL is MasterCard's customer extranet. First, an administration web application 242 is used to configure the decisioning platform 200. The system 200 allows the configuration of customers, card bin ranges, scoring models, input and output channels, thresholds, and billing rates. The reporting web application 244 provides scoring analytics which can be used to analyze performance as well as to provide visibility into the system operation and billing. A technical support analyst is able to access the administration web application 242, reporting web application 244, and Case Management application 246 MOL web applications as well as the operations monitoring and dashboard 250.

Customers are able to access the decisioning platform administration web application 242, reporting web application 244, and Case Management application 246 through a Customer Portal 252. The Customer Portal 252 is exposed via MasterCard OnLine (MOL). On a monthly basis, the system 200 calculates billing for the customers using a billing processor 260 and sends the resulting charges to a MasterCard Billing System (MCBS) 262.

The above described platform scores real time transactions within low latency targets and is able to readily scale for increasing transaction volumes. In addition, model creation and customer boarding times are minimized. While performance is critical, the highest performance is achieved with minimal impact to the maintainability of the system.

The scoring platform is an open architecture featuring loosely coupled, pluggable, highly configurable components while readily supporting new input and output channels as well as new scoring engines. The framework for supporting the administration, licensing, billing, monitoring, and reporting functions readily supports such flexibility.

Figure 5:
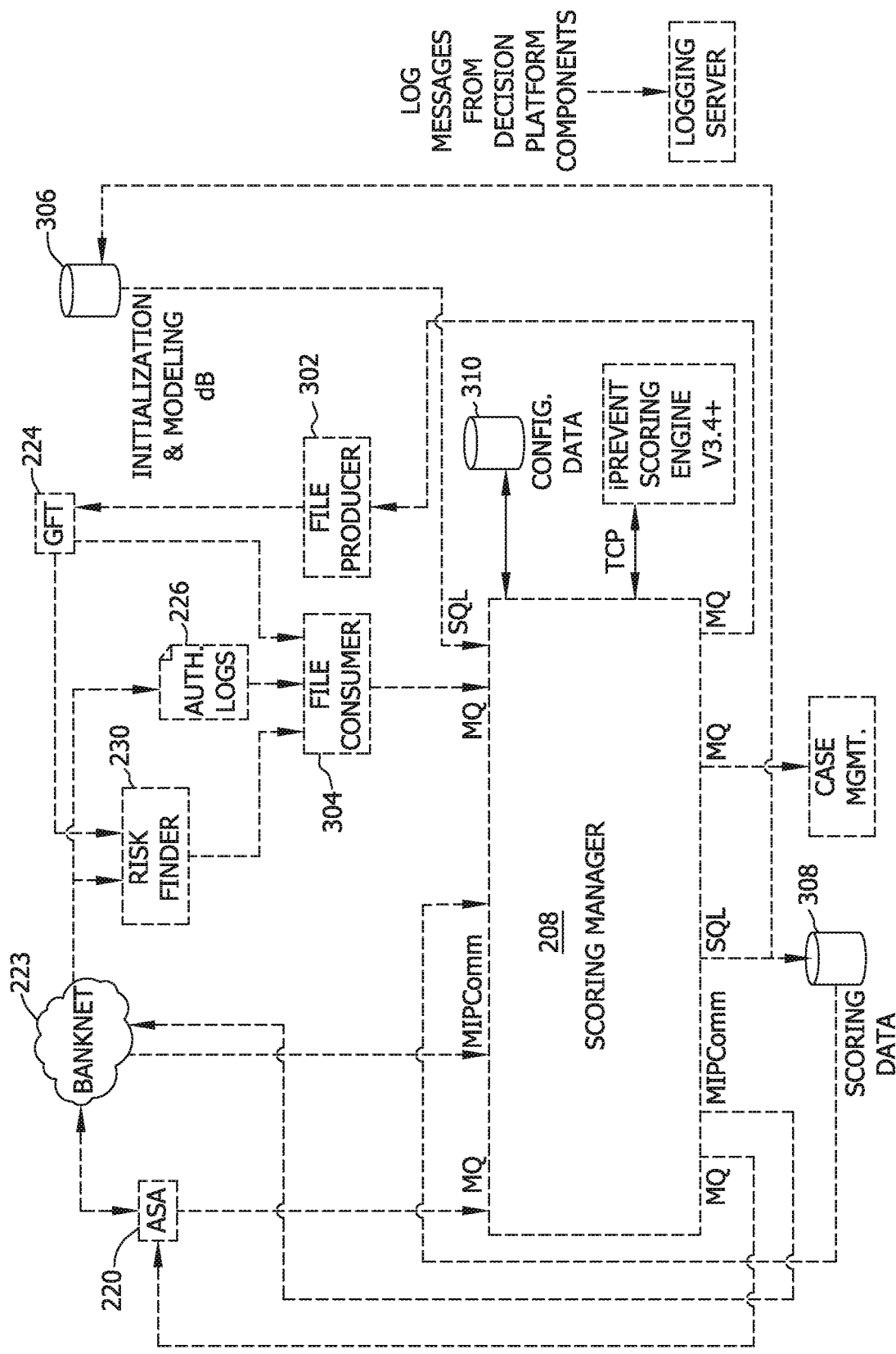
FIG. 5 is a diagram illustrating a logical architecture for the decisioning platform of FIG. 4.

FIG. 5 is a diagram illustrating a logical architecture 300 for the above described decisioning system 200 where common components are illustrated with the same reference number as used in previous figures. The logical architecture 300 features a scoring manager 208 which is responsible for processing the transactions. The scoring manager 208 receives transactions from a variety of input channels which include the ASA 220, Banknet 223, Batch Files, and Databases. The ASA 220 sends transactions directly to the scoring manager 208 via IBM WebSphere MQ (MQ). Customers' transactions are sent to the scoring manager 208 via Banknet 222. The File Consumer 302 reads transactions from files and delivers these transactions to the scoring manager 208 via MQ. The File Consumer 304 receives customer batch files from GFT 224, Risk Finder Transaction Input files from Risk Finder 230, and Authorization Log files 226. The File Consumer 304 watches an input landing zone, reads all delivered files, optionally filters transactions not configured for scoring, and outputs the individual transactions in an MQ message. The Scoring Manager 208 retrieves historical transactions from the initialization and modeling database 306 for customer initializations. In addition, transactions that failed to process correctly will be retrieved from the Scoring Data database 308 and re-attempted.

The scoring manager 208 listens on the input channels 202 via configurable adaptors. For example, a Banknet Input Adaptor establishes a listener on Banknet 223 via the MIPComm (MasterCard Interface Processor Communication) libraries to receive 0120 scoring request, 0630 confirmations, and 0800 login/logout messages. The transactions received from the input channels 202 are then processed using a flexible combination of transformations, filtering, and enrichment including scoring of the transactions using the Brighterion iPrevent Scoring Engine. The processing results are delivered via a variety of output channels 214 which include MQ message to the ASA, MIPComm communication on Banknet, MQ messages to the File Producer, MQ messages to a vendor Case Management system (or other delivery mechanism), and SQL commands to load data into the scoring database 308 and modeling databases 306.

The scoring manager 208 includes a highly flexible transaction processor that is driven by database Configuration Data 310 and plug-in components. As an example, a 0120 message received from the Banknet adaptor 223 is transformed from the CIS0120 format and the account number used to retrieve the customer specific execution plan. Table 1 includes example execution plan steps for an example account that is in the bin range of customer A.

TABLE 1

| Step | Component | Name | Customer Parameters |
|---|---|---|---|
| 1 | Filter | Issuer Generated 0120 (fail = skip to step 4) | |
| 2 | Transform | CIS0130 | |
| 3 | Output | Banknet 0130 | Override IP Addr = a.b.c.d |

TABLE 1-continued

| Step | Component | Name | Customer Parameters |
|---|---|---|---|
| 4 | Filter | Duplicate Check (fail = skip to step 11) | |
| 5 | Filter | MCC Filter (fail = skip to step 11) | MCC = 1234, 2345, 2341 |
| 6 | Enrichment | Issuer Country Code | |
| 7 | Enrichment | iPrevent Scoring | Model = CustomerAA |
| 8 | Filter | Threshold (fail = skip to step 11) | Threshold = 700 |
| 9 | Transform | Banknet 0620 | |
| 10 | Output | Banknet 0620 | Override IP Addr = a.b.c.d |
| 11 | Output | Scoring Data Collector | |
| 12 | Output | Performance Data Collector | |

This same highly flexible transaction processor is also used to implement the File Consumer 304 and File Producer 302. For example, the File Consumer 304 is configured to read customer batch files from an input landing zone. For each transaction in the file, no transformation is performed but the following execution steps, shown in Table 2, are performed independent of the customer data:

TABLE 2

| Step | Component | Name | Customer Parameters |
|---|---|---|---|
| 1 | Output | Batch Scoring Manager MQ Adaptor | Queue = xxxx QMgr = yyyy |

Figure 6:
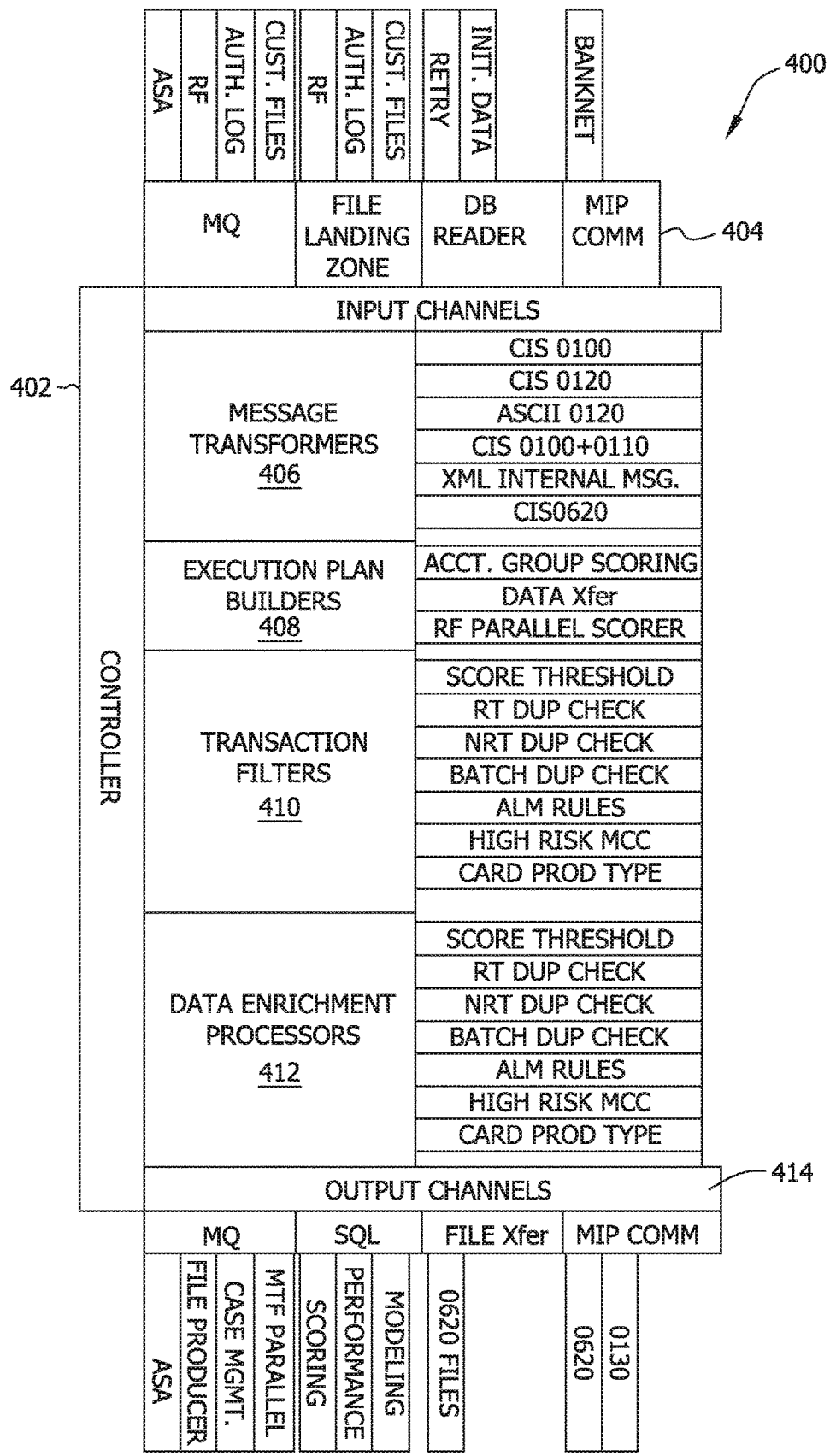
FIG. 6 is a logical architecture diagram for a flexible transaction processor included within the decisioning platform of FIG. 4.

FIG. 6 is a logical architecture diagram for a flexible transaction processor (FlexTP) 400 that is utilized in the decisioning platform of FIG. 4. The main components of the flexible transaction processor 400 are the controller 402, input channel adaptors 404, message transformers 406, execution plan builders 408, transaction filters 410, data enrichment processors 412, and output channel adaptors 414. The flexible transaction processor 400 features a component plug-in architecture to provide a highly configurable transaction processor. The plug-ins can be added or changed at run time. In one specific implementation, plug-ins are written to be thread-safe so that multiple instances of a plug-in do not need to be constructed to save execution time.

The controller 402 is configured to control the execution of the FlexTP 400. At startup, the controller 402 logs a start up message to a logging server (not shown). The controller 402 then launches the configured plug-ins for the input channel adaptor 404. The number of threads and priority of each adaptor 404 is configurable. The input channel adaptor 404 receives transactions from the configured input channel, creates an internal message to hold the unparsed transaction and input channel information which is then returned to the controller 402.

If the input message type is configured for a transformation, the controller 402 invokes the Transform Service (message transformers 406) with an internal message object and the configured transformation type. The message transformers 406 looks up the appropriate transformation plug-in and use the plug-in to create the appropriate parsed transaction data object (e.g., 0100, 0120, 0100+0100), includes this parsed transaction data object in the internal message object and returns the internal message object to the controller 402. The controller 402 then invokes the execution plan builders 408 with the configured builder name and the internal message object. The execution plan builder 408 looks up the appropriate builder plug-in and uses it to create an execution plan for the transaction. The execution plan builder 408 then includes the execution plan in the internal message object and returns it to the controller 402. If the transaction fails the message transformation step or the execution plan builder step, the controller 402 executes the configured failure execution plan.

Using this execution plan, the controller 402 then invokes the specified transformations, transaction filters 410, enrichment processors 412 (including scoring engines), and output delivery channels 414 as specified by the execution plan. For each step, the controller 402 passes the internal message object and the appropriate configurations to the component service. The component service looks up the appropriate plug-in and uses it to perform the appropriate processing, includes any new or altered data in the internal message object, and returns it to the controller 402. Each component returns an indication of its success or failure which is used by the controller 402 to manage the execution of the message. If the controller 402 receives an error at any processing step, it should execute the failure execution plan for that step. If any transaction filter 410 does not pass, the controller 402 executes the filter alternate flow instead of the planned execution flow.

In one embodiment, the controller 402 executes all tasks sequentially. In alternative embodiments, the controller 402 includes a capability to process some steps in parallel. This "parallel processing" is accomplished using separate worker threads for each parallel task and waiting for all tasks to complete prior to continuing.

When properly configured, the controller 402 executes within a unit of work. For example, the entire set of processing from accepting a transaction from an input channel 404 through to delivery to an output channel 414 should be performed within the same transactional unit of work. If any problems are encountered, the unit of work is rolled back. This capability is required for transaction flows that require 100% processing without dropping any transactions in the event of a failure. While this might result in some transactions going through part of the processing twice, this insures that all transactions are successfully processed.

The controller 402 also provides an ability to gracefully shutdown. To accomplish such a shutdown, all threads should complete their unit of work and not start processing any new transactions. When all threads have completed their processing, the controller 402 logs a shut down message and ends the processing.

Any errors not specific to a single transaction are logged via the above mentioned logging server (not shown in FIG. 6). Errors isolated to a single transaction (e.g., missing data required for scoring), are included in the execution plan status for the appropriate step. If configured, the data collector 214 (shown in FIG. 4) will save this information to the database.

In one specific embodiment, the controller 402 is implemented as a daemon process, and periodically polls its configurations. If any changes are detected, it reconfigures as appropriate and logs an information message. Also, the controller 402 listens on a control command queue using an MQ input adaptor.

The following control commands are supported: graceful shutdown request, forced shutdown request, pause request, resume request and log thread status. In regard to a graceful shutdown request, after each thread is finished with processing the current transaction, the controller should stop the thread. When all threads are stopped, the controller 402 shuts down. For a forced shutdown request, the controller 402 interrupts any processing threads and shuts down immediately. For a pause request, after each thread is finished with processing the current transaction, it should pause until a resume request is received. For a resume request, the processing of any paused threads is resumed. For log thread status, the controller 402 logs information about how many threads are running, their priority, status, etc.

Plug-ins associated with the input channel adaptor 404 are used to receive transactions. Abstract input channel protocol adaptors are defined, as shown in FIG. 6, to support MQ listeners, file input landing zones, database readers, and Banknet communications via MIPComm. These abstract protocol adaptors provide helper methods for interacting with the specific protocol. They are extended by input channel adaptor plug-ins (e.g., ASA MQ Input Adaptor) which provide an ability to identify the specific input channel messages and create the internal message object which includes the appropriate input channel information as well as the unparsed transaction data. Each input channel adaptor listens on the specific input channel for transactions, constructs an internal message object to hold each transaction, and passes the internal message to the controller 402 for processing. A log message is generated and sent to the logging server for appropriate events such as startup/shutdown of the listener, any messages returned by the adaptor at startup and shutdown, or any non-transaction specific errors.

The MQ listener input channel establishes the configured number of threads as listeners on the configured MQ Queue Name and Queue Manager Name. The MQ header information is included in the internal message as input channel specific information. This includes the reply to queue and queue manager name. If the internal message cannot establish itself as a MQ listener or failures stop it from listening, it will attempt to reestablish itself as a listener. If unsuccessful, it will periodically reattempt after waiting a configurable interval. The MQ message is passed to an abstract method which returns an Internal Message object. This method is implemented by each plug-in, including the ASA plug-in, the RF plug-in, the authorization logs plug-ins, the customer files plug-in, and the control command plug-in.

With respect to a file input landing zone input channel, the configured number of threads watching for files to arrive in the specified location/directory is established. To accomplish this, the input channel regularly polls the input landing zone(s) for files to arrive at a configured interval. When a file arrives, the adaptor determines if the file name matches any configured regular expression to determine if it should be processed. If there is a file name match, the adaptor will insure that this file has not already been processed based on a processed files database table. If the files do not pass these checks, they will not be processed and removed from the input landing zone.

If the files do pass these checks, a record of the file is added to the processed files database table. In one embodiment, this database table includes a filename, a file creation date/time (e.g., when it was received from GFT), a customer ID, a path name, a file status (Processing, duplicate, filtered out, completed, error), a processing start time, a processing end time, a listener name, a consumer name, a transaction count, a last checkpoint ID, and a last checkpoint timestamp.

Each transaction is then read from the file and sent to the controller 402. The listener is configured, in one embodiment, to ignore any header or trailer data in the file. The file name and any important information in the header/trailer is included in the input channel specific information in the internal message object on all transactions in the file. The process should implement a configurable throttle to control the rate at which messages are placed on the queue so as to not swamp the system. After processing all transactions in a file, the process updates the processed file record to indicate a successful processing of the file, and sends a log message to the logging server to indicate the file was successfully processed. In addition, a performance log message is sent which includes the file name, the number of transactions processed, the processing start time, and the processing end time.

The listener is configured such that no two threads attempt to process the same file. In addition, the process is written to be fail-safe by insuring that every transaction in every file that is not filtered out is delivered to the input queue at least one time. Some level of duplicate delivery is acceptable as the decisioning platform will eliminate duplicates. To accomplish this duplicate elimination, the process saves a check point every configurable number of transactions for failure accommodation. If a failure occurs during file processing and the process is restarted, processing starts again at the same file, at the last check point. This strategy insures all transactions are processed and placed on the queue while minimizing the number of resends in the event of a failure.

When processing of the file is finished, it is moved out of the input landing zone to the completed/archive directory. The entries in this processed file table are purged on a regularly configured basis to only retain for a pre-defined period of time.

In one embodiment, the following file input landing zone plug-ins are utilized and include authorization logs files, risk finder parallel scoring files, and customer batch files.

With regard to the database reader input channel, this listener is configured to periodically execute a configured query against a database at a specified interval. The query returns a set of transactions which are then sent individually to the controller 402. The database reader input channel keeps track of which transactions have been successfully processed and which are able to recover from a failure. To accomplish this transaction monitoring, the result set is limited to a configurable amount and a configurable throttle (e.g., a wait time) is used. The query is ordered by date/time and a checkpoint row ID is saved after each block of transactions is processed. For the database reader input channel, the following plug-ins are supported in one embodiment, and include an initialization data loader plug-in, a retry data plug-in, and an MTF parallel score.

Figure 7A:
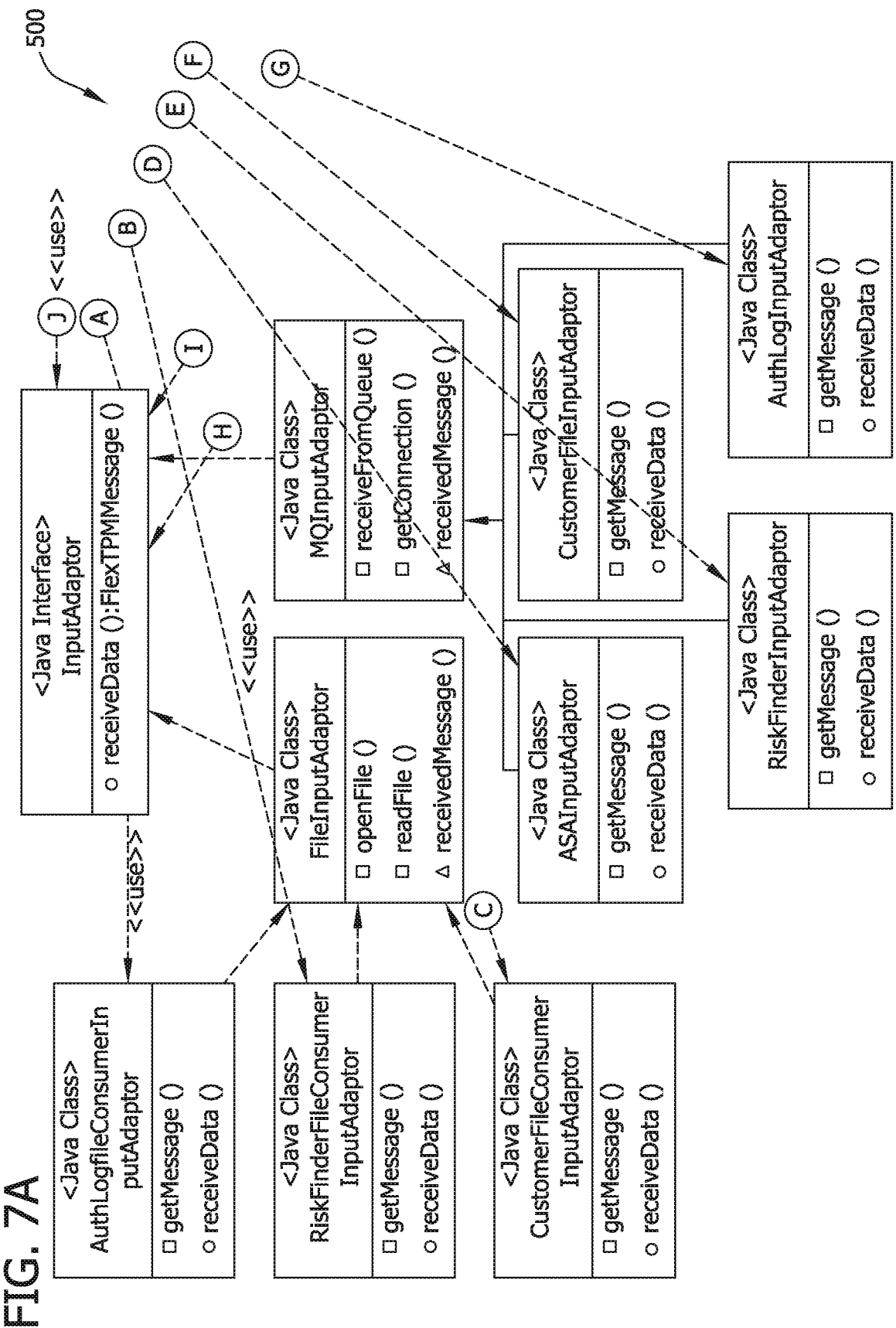
FIG. 7A is an example class structure diagram for the input channels of the flexible transaction processor of FIG. 6.
Figure 7B:
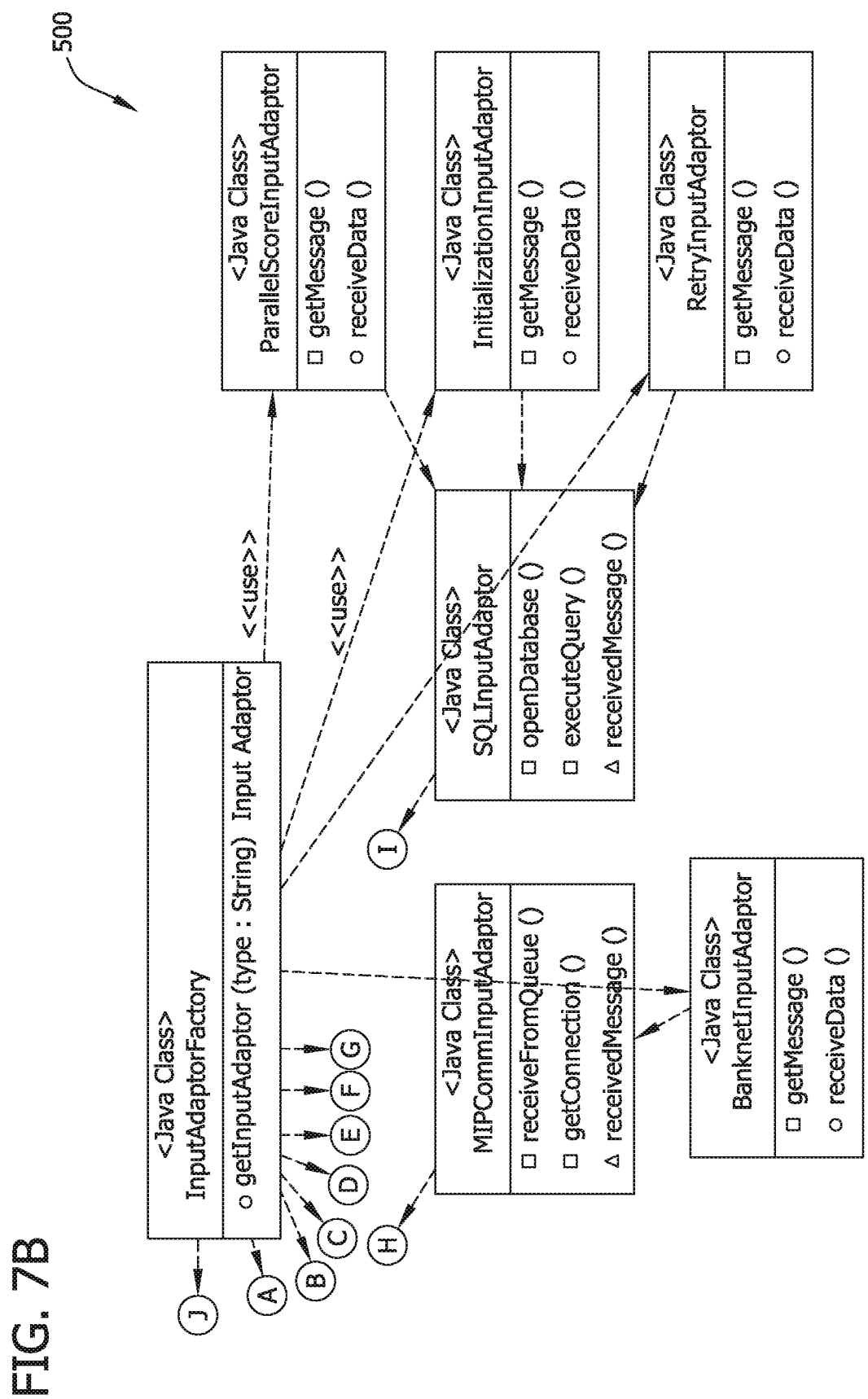
FIG. 7B is an example class structure diagram for the input channels of the flexible transaction processor of FIG. 6.

A Banknet MIPComm input channel adaptor establishes listeners on the configured Banknet queues using the MIPComm libraries. The following plug-ins are used in one embodiment, and include an input message queue—for Receive 0120, 0630, & 0800 messages and a process negative queue, where a listener is established that reports any issues with messages sent out by the decisioning system and correlated with the Banknet reference number. This information is saved in the scored transaction database. FIG. 7 is a diagram 500 showing one embodiment of a class structure for the input channels.

With regard to message transformers 406, a message transform service accepts an internal message object and a transformation type. The service looks up the specified transformation plug-in and uses it to create a new transaction. The message transformations use a plug-in design, and transformation plug-ins conforming to the transformation API will be developed. The following transformation plug-ins have been developed and include ASA ES Request with CIS0100, CIS0120, JLog (e.g., CIS0100+0110), ASCII0120, and XML Internal Format In one embodiment, the authorization systems' NCSLib is used to perform CIS message transformations. The NCSLib is a 32 bit C program. To work with Java, a JNI interface is used and the Java application is compiled and run with the 32 bit option. Running the FlexTP Java application in 32 bit mode is not expected to have any negative impact as high precision arithmetic is not required. A positive benefit is that it will result in a smaller memory footprint. The XML internal format conversion is performed using the XStream XML parser which is a high performance parser made for transaction processing. The plug-in architecture described herein also supports definition of plug-in specific transaction objects (e.g., 0100, 0120 transaction data, 0100 and 0120). New transaction data types can easily be added using this mechanism.

Figure 8:
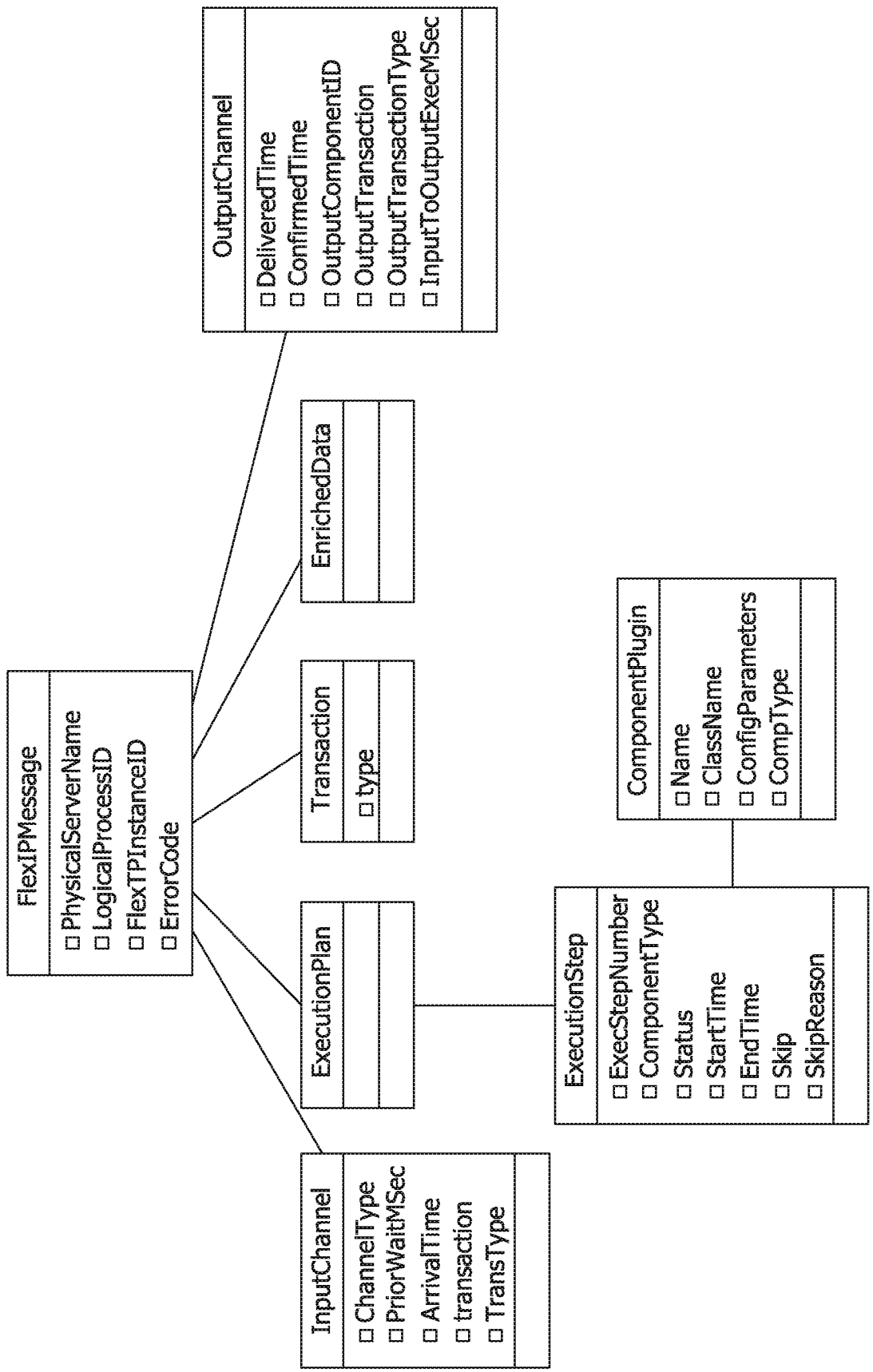
FIG. 8 is a class structure diagram illustrating internal message object formats utilized with the flexible transaction processor of FIG. 6.

Referring to FIG. 8, and with regard to internal message formats, the FlexTP architecture of FIG. 6 uses the internal message object illustrated in FIG. 8 to pass messages between the components. In the illustrated embodiment, the FlexTP message object contains one input channel object that contains information about how the transaction arrived, one execution plan object that contains the steps for processing the object, one to many transaction objects that contains the details of the transaction, one instrumentation object that contains instrumentation details on the relative to the processing instance, zero to many enriched data objects that contains enriched data, and zero to many output channel objects that contains information about resulting transactions sent to an output channel.

Figure 9:
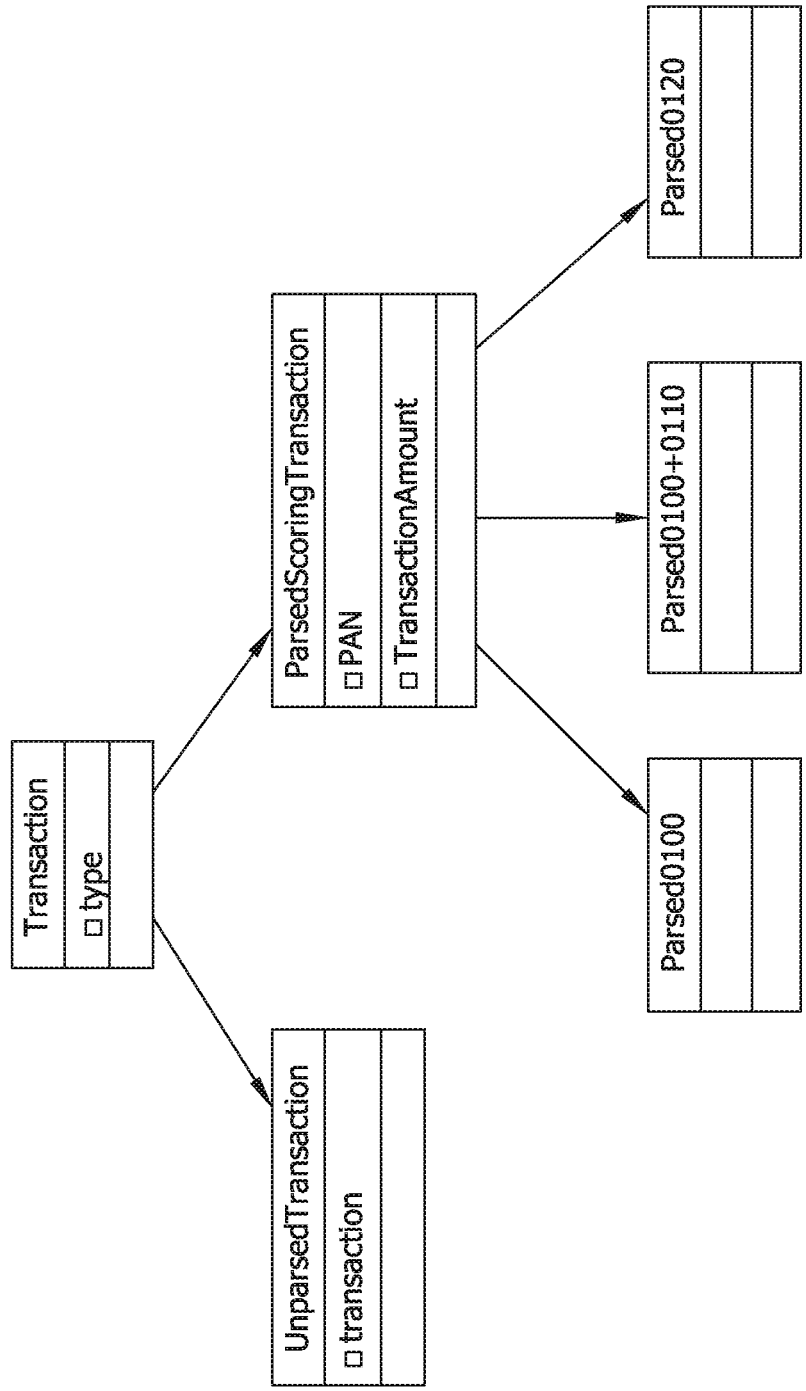
FIG. 9 is a class structure diagram illustrating transaction objects for abstract classes and sub-classes utilized with the flexible transaction processor of FIG. 6.

The Transaction object of FIG. 9 is an abstract class that can be sub-classed for any type of transaction. Subclasses have been developed that consist of UnparsedTransaction to hold any packed transaction and ParsedScoringTransaction for each of the expected input transactions (e.g., 0100, 0120, and 0100+0110).

Figure 10:
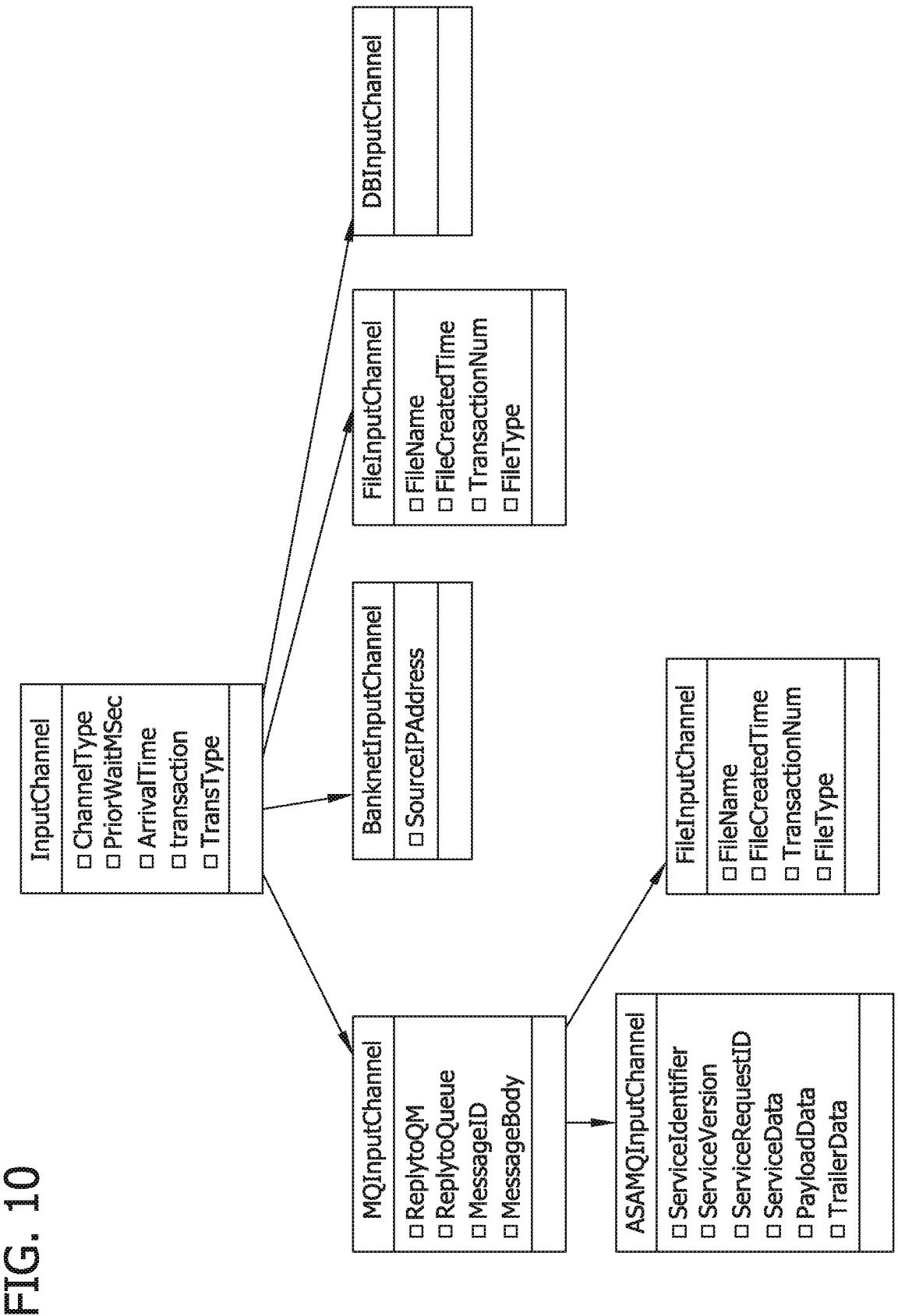
FIG. 10 is a class structure diagram illustrating input channel object subclasses by specific input adaptors that are utilized with the flexible transaction processor of FIG. 6.

Now referring to FIG. 10, the InputChannel object is subclassed by specific input adaptors to hold protocol specific information as shown. The illustrated examples include MQInoutChannel, BanknetInputChannel, FileInputChannel, ASAMQInputChannel, and FileMQInputChannel.

Execution plan builder plug-ins are defined to specify the execution plan for processing a transaction. These execution plans include the ordered set of execution steps using the appropriate transaction filters, data enrichment processors, and output delivery channels. Each execution step includes a type (Transformer, Filter, Data Enrichment Processor, or Output Channel), a name (the component name), a plug-in class name (the actual class name of the plug-in), plug-in specific configuration parameters (which includes any configuration parameters such as a score filter threshold value), a failure resume step (if execution of this step fails, processing should resume at this step), and a filter resume step (if a components filter check does not pass, execution resumes at this step).

A standard scoring builder uses the transaction PAN and input channel type to lookup the corresponding customer account group configurations established through the Admin system located in the Admin database. This configuration data is used to create the customer specific execution plan. In one embodiment, these configurations are cached in memory and refreshed at a configurable interval for improved performance.

With regard to transaction filters 410, and referring to FIG. 11, the transaction filter service is invoked to filter a transaction using the configured plug-in for that execution step. For example, the transaction filter service uses a factory to retrieve an instance of the plug-in class that conforms to the transaction filter interface. The plug-ins are written to be thread-safe so that multiple instances of a plug-in do not need to be constructed to save execution time. The transaction filter plug-in class executes logic that analyzes the transaction data and returns a pass or fail indication to the controller 402. If the filter check passes, the controller 402 continues the execution plan at the next step. If the filter check fails, the controller 402 skips down to the configured execution step.

An operational skip filter checks to see if any operation skips are configured that apply to this transaction. Operational skips can be defined using the Admin application and will consist of an account range to skip processing. A score threshold filter checks if the transaction score is below the supplied threshold parameter. If so, the transaction will skip delivery to the configured output channels (e.g., Banknet adaptor, batch file adaptor, etc.).

A duplicate check filter performs a check to see if the transaction has already been scored and, if so, apply the previous score to the transaction. This duplicate check filter is a function of the input channel. A real time 0100 ASA transactions filter determines if the transaction has an ES Status Code of 'S' indicating the transaction is going to stand-in and is a potential duplicate. If so, it will check the duplicate check queue to determine if the transaction has been already been processed. If so, the previous transaction score will be looked up in the scored transaction database and included in a Scoring Result object. The execution plan will be altered to skip the scoring step. For all transactions going through the filter, an entry is added to the duplicate check queue consisting of the Banknet reference number with a message expiration time of 30 seconds. For a near real time 0120 Banknet transaction, a similar check to the real time duplicate check filter is performed except that the ES Status Code check is not used as it does not apply. For catch-up transactions, it is determined whether this transaction score element is populated if it should have been scored in real time. If so, it was previously scored. If not, check if this transaction has been previously scored based on the scored transaction database. Previous scored transactions should not be scored again. The execution plan should be altered to remove the any steps except for delivery via a data collector output adaptor for modeling and confirmation of real time delivery. For customer batch file transactions, it is determined if this transaction is present in the scored transaction database. On-us transactions are looked up based on the STAN, PAN, and Transaction Date. For risk finder input transactions for parallel scoring, the scored transaction database is checked to see if this transaction has been previously scored. Such an approach features a database lookup in some cases for determining duplicates.

A risk finder parallel scoring filter parses the PAN out of the fixed length CIS message and determines if it is applicable for parallel scoring. If not, the transaction should be discarded. An Account Level Management (ALM) filter uses the original CIS transaction to determine if it passes any ALM rules such as a rule that only scores a specific card product type. This filter is used in processing the authorization logs to determine if a transaction should have been scored. A card product type filter determines if the transaction card type was in the customer specific list of card types to be scored. A Merchant Category Code (MCC) filter determines if the transaction MCC code was in the customer specific list of MCC codes to be scored. It should be noted that filters may also return enriched data objects. For example, the duplicate check filter will return the previous scored in an enriched data object if the filter check does not pass (e.g., transaction is a duplicate).

With regard to data enrichment processors 412, such processors are defined which enrich the transaction by adding new data or altering existing data. Each data enrichment processor 412 implements an API which consists of accepting the internal message. The processor alters the transaction data and includes new enriched data objects. The following paragraphs define several example data enrichment processors, including an issuer country code, and an iPrevent scoring engine. Other data enrichment processors include, for example, a last response code, a compromised account indicator, a fraud mark scoring engine, global analytics scoring engine, and a rules engine.

If the issuer country code is not supplied in the transaction, this data enrichment processor will determine the issuer country code based on the appropriate Auth Account Range. The iPrevent scoring engine performs the following steps: creates an iPrevent message from the Internal Message Format, takes a time snapshot, sends a request to the iPrevent TTS Server based on the configured IP Address performs a watch over request, receives a response from iPrevent, takes a time snap shot, parses out the score, reason codes, individual technology scores, and any failure codes, and return the internal message object. Note that TCP socket connections to a specified IP address are pooled for increased performance. The IP address is configured based on the account group. This is needed on the batch server where multiple TTS server clusters must be accessed from the same Batch Scoring Manager (this is because auth logs could have accounts in any scoring cluster). In regard to the watch over request, if the request exceeds a configured time, the TCP connection is terminated and the transaction is considered as not being scored.

Now referring to output channels 414, output channel adaptor plug-ins can be defined for delivering processed messages. These output channel adaptors accept an internal message and return an indication of whether the delivery was successful. Abstract protocol adaptors are defined to support MQ, MIPComm, SQL, and GFT. These abstract protocol adaptors provide helper methods for interacting with the specific protocol. The MQ protocol adaptor provides methods for attaching to a configured queue and putting messages. The MIPComm adaptor provides methods to integrate with the MIPComm libraries for sending transactions on Banknet. The SQL protocol adaptor provides connection pooling to a configured database. The GFT Adaptor provides an interface to the GFT libraries for sending batch files via GFT. Plug-ins can extend an abstract protocol adaptor to simplify the plug-in development. The following output channel adaptor plug-ins will be defined:

For an MQ ASA output channel adaptor plug-in, the ASA output adaptor will creates an MQ message that contains the scoring results. If the transaction was successfully scored, the actual score should be returned and the service status set to 'C' for complete. If the transaction was not successfully scored, the actual score should be left blank and the service status set to 'E' for error or Blank if the scoring was not attempted. The ASA time stamp in the ES request message trailer is returned in the ES response message trailer and is used by the ASA to measure the real time scoring system response time. This MQ message is delivered to the reply-to queue and queue manager from the input message.

The MQ batch output file producer output channel adaptor plug-in will create an MQ message that contains the fields necessary for the file producer to create a file of 0620 transactions.

For a SQL scoring data collector output channel adaptor plug-in, this adaptor saves the scored transaction to the database. In addition, it keeps track of summarized scoring results per account range. A performance data collector output channel adaptor plug-in calculates performance statistics including min, max, and average over pre-defined intervals (e.g., last 30 sec, 5 min, 1 hr, 2 hr, last day, last week, etc) for overall real time processing, individual component processing times, TPS, and total number of transactions processed, and saves performance data to a database. In one embodiment, these statistics are calculated for the entire platform and per customer and should allow segregation by successfully scored vs. failed transactions. To save performance data to a database, warning messages are logged if performance is lower than pre-configured thresholds For the file transfer output channel adaptor plug-in, the 0620 File Adaptor will create a file of 0620 transactions. After configured interval and/or # transactions, the file will be sent via GFT to the customer.

The MIPComm output channel adaptor plug-in determines the Banknet routing address. If the customer override IP address is provided, it should be used. Otherwise, the IP address from the input transaction should be used. Note that some customers use override to use a fixed group IP address. When the transaction is routed to the address, Banknet will round robin transactions to the MIPs belonging to the group. The 0130 output adaptor will send a CIS0130 message to the specified Banknet Address. The 0620 output adaptor will send a CIS0620 message to the specified Banknet Address. The 0820 output adapter stores and forwards delivery complete.

Figure 12A:
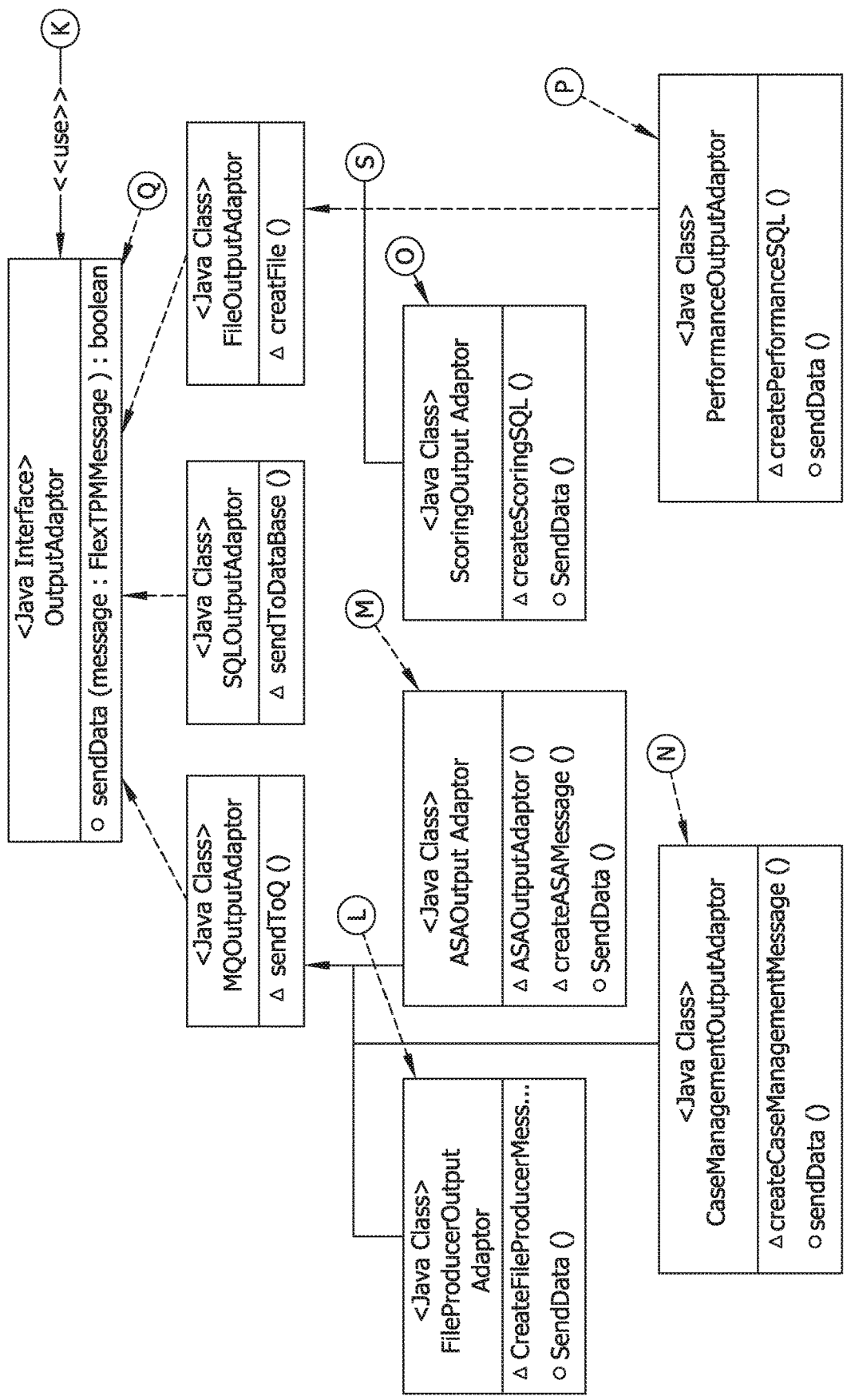
FIG. 12A is an example class structure diagram for the output channels of the flexible transaction processor of FIG. 6.
Figure 12B:
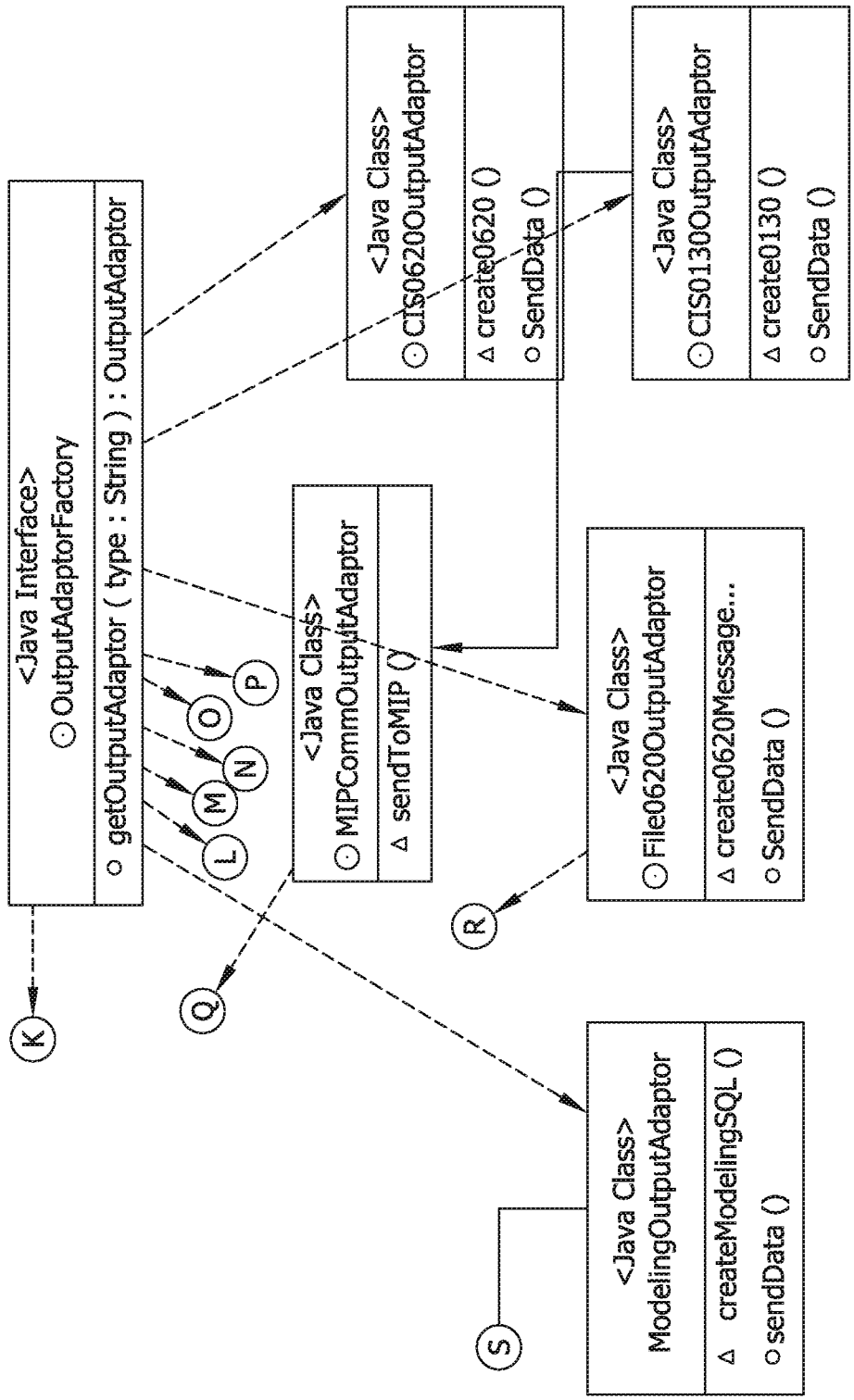
FIG. 12B is an example class structure diagram for the output channels of the flexible transaction processor of FIG. 6.

The output channels described above use the class structure illustrated in FIG. 12. Various technical platforms are used, including, Solaris 10, Sun Java 1.5, Log4J 1.2.x, MIPComm version 8.1—compiled for Solaris 10, WebSphere MQ V6.0.2, WebSphere MQ Application Messaging Interface for Java, Hibernate 3.1.3, and Spring 2.53.

Figure 13:
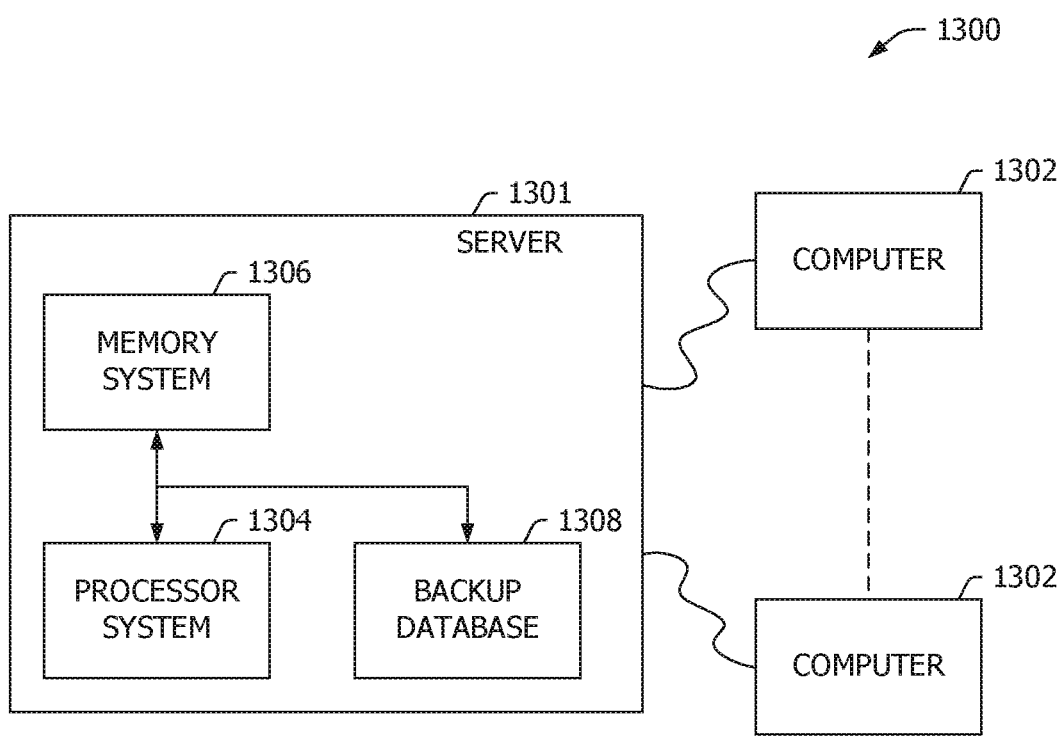
FIG. 13 is a simplified block diagram of an exemplary system 100 in accordance with one embodiment of the present invention.

FIG. 13 is a simplified block diagram of an exemplary system 1300 in accordance with one embodiment of the present invention. In one embodiment, system 1300 is the financial transaction card payment system shown in FIG. 1, which can be utilized for providing a decision making platform. More specifically, in the example embodiment, system 1300 includes a server system 1301, and a plurality of client sub-systems, also referred to as client systems 1302, connected to server system 1301. In one embodiment, client systems 1302 are computers including a web browser, such that server system 1301 is accessible to client systems 1302 using the Internet. Client systems 1302 are interconnected to the Internet through many interfaces including a network, such as a local area network (LAN) or a wide area network (WAN), dial-in-connections, cable modems and special high-speed ISDN lines. Client systems 1302 could be any device capable of interconnecting to the Internet including a web-based phone, personal digital assistant (PDA), or other web-based connectable equipment.

In the example embodiment, server system 1301 includes a processor system 1304 that includes a plurality of data processing units. Processor system 1304 is in communication with a memory device 1306 that includes various forms of read/write random access memory, including volatile memory such as DRAM and non-volatile memory such as FLASH memory, and/or any other type of memory that enables memory device 1306 to function as described herein. Memory device 1306 may also include read-only type memory such as ROM memory. In the example embodiment, memory device 1306 is an in-memory data grid in which data is moved off disk storage and into main memory, thus avoiding the need (and delay) to run disk-seek operations each time a data look-up is performed. Alternatively, memory device 1306 may include an in-memory object grid and/or an in-memory database. Memory device 1306 significantly increases overall system performance and availability of stored data, and provides agility in refreshing off-line analytics stored in memory device 1306. By using memory device 1306, system 1300 is able to quickly score a candidate transaction using scoring engine 210, and ultimately approve or deny the candidate transaction. Specifically, historical transaction data can be stored within memory device 1306, and this historical transaction data can be retrieved and processed along with transaction data for the candidate transaction to determine whether to approve or decline the candidate transaction. This processing can be done in near-real time as part of the automatic process.

In the example embodiment, memory device 1306 stores at least one enriched data object that may be used by decisioning platform 200 (shown in FIG. 4) to enrich a transaction. The enriched data object includes historical transaction data associated with the payment transaction card, summarized historical trends in the historical transaction data, results of off-line analytic analysis associated with a transaction data element, and issuer specific preferences specified by an issuer of the payment transaction card. In one embodiment, the enriched data object may be used by scoring manager 208 (shown in FIG. 4) to assist in determining which scoring engine(s) 210 (shown in FIG. 4) should receive the transaction data for scoring. In another embodiment, the enriched data object may be used by scoring engines 210 in determining a fraud score for the transaction. For example, where the enriched data object includes historical trends and/or data analytics, scoring engines 210 may consider a number of e-commerce transactions completed by a cardholder over a specified time period (e.g., one year) in determining whether the transaction is potentially fraudulent.

Though the collected and analyzed data may be stored in main memory system 1306 for performance reasons, server system 1301 may include a suitable backup or remote database in order to provide permanent storage of data. For example, a backup process may execute in server system 1301 to read out data stored in system 1306 to be stored in a backup database 1308. Backup database 1308 may be stored on server system 1301, or may be remotely located from server system 1301.

In another embodiment, a computer and a computer program are provided which are configured or programmed to perform steps similar to those already recited herein.

The systems and processes described herein enable a user, such as a financial transaction card network (e.g., Master-Card®), to take financial transaction data received from a variety of different input channels and pre-process the transaction data into a common data format. Data enrichment is provided to the commonly formatted transaction data, based on the user's position as operator of the network. Examples of data enrichment include indications as to whether or not the transaction cards were recently compromised and other augmenting data with information regarding which country the issuer of the card resides. Such enrichment and augmentation is used in part to orchestrate financial scoring of individual transactions.

Several products are available to do the financial scoring each of which incorporate fraud models and different artificial intelligent technologies to score the transactions. The described embodiments, in part, provide a mechanism to generate a financial scoring using multiple scoring products. Selection of which scoring products are used, and in which combinations, are determined by the used based on what scoring products they wish to offer to different customers, for example, a fraud score and/or a credit risk score. The embodiments describe an architecture that allows a user to plug in different scoring models and then score transactions using single scoring products or multiple combination of multiple scoring products to provide value added services to, for example, customers of the above mentioned financial transaction card network.

The embodiments allow the user to easily integrate, for example, multiple vendor scoring products, while also orchestrating scoring across many of the scoring products. The architecture combines the scores and returns those scores back to customers through the variety of output channels described above.

While the invention has been described in terms of various specific embodiments, those skilled in the art will recognize that the invention can be practiced with modification within the spirit and scope of the claims.

What is claimed is:

1. A computer-implemented method for providing enriched transaction data for real-time fraud scoring of a plurality of transactions by a plurality of scoring models, each scoring model having an expected data input format, each transaction requiring a real-time authorization decision by an authorizing third party, said method performed by a computer system comprising a processor and a memory device in communication with the processor, the computer system in communication with a payment card processing network, said method comprising:
  receiving, from a plurality of computing devices of a plurality of requesting parties, scoring request messages each associated with a candidate transaction initiated by a customer, each scoring request message including transaction data for the candidate transaction;
  creating, for each scoring request message, an internal message object;
  invoking, for each internal message object, a transform service, wherein the transform service determines a message transformation plug-in corresponding to one of the plurality of scoring models;
  generating, for each internal message object using the corresponding message transformation plug-in, a parsed transaction data object corresponding to the expected data input format of the corresponding scoring model, wherein the parsed transaction data object includes at least a portion of the transaction data and is added to the internal message object;
  invoking, for each internal message object subsequent to adding the parsed transaction data object, an execution plan builder, wherein the execution plan builder generates an execution plan for the candidate transaction and adds the execution plan to the internal message object, wherein the execution plan specifies the corresponding scoring model;
  invoking, for each internal message object subsequent to adding the execution plan, the scoring model specified by the execution plan, wherein the scoring model operates on the transaction data included in the parsed transaction data object and returns a fraud score;

enriching, for each transaction, the transaction data by adding the fraud score to the transaction data; and transmitting, for each transaction, the enriched transaction data to the authorizing third party for making the real-time authorization decision.

2. The computer-implemented method of claim 1 further comprising storing, for each transaction, the transaction data in an in-memory data grid.

3. The computer-implemented method of claim 2, wherein storing the transaction data in the in-memory data grid further comprises storing the transaction data including at least one of financial transaction data, healthcare transaction data, and personal identity transaction data.

4. The computer-implemented method of claim 2, wherein storing the transaction data in the in-memory data grid further comprises storing financial transaction data including an account number and is associated with a purchase made by a cardholder using a payment card.

5. The computer-implemented method of claim 2, wherein storing the transaction data in the in-memory data grid further comprises storing the transaction data in one of an in-memory object grid and an in-memory database.

6. The computer-implemented method of claim 2, wherein storing the transaction data in the in-memory data grid further comprises storing the transaction data received from an input channel including at least one of an interchange network, and a web-based network such as the Internet.

7. The computer-implemented method of claim 2, wherein invoking the scoring model further comprises retrieving, from the in-memory data grid, at least one of historical transaction data associated with a payment card, summarized historical trends in the historical transaction data, results of off-line analytic analysis associated with a transaction data element and issuer specific preferences specified by an issuer of the payment card.

8. A computer system for providing enriched transaction data for real-time fraud scoring of a plurality of transactions by a plurality of scoring models, each scoring model having an expected data input format, each transaction requiring a real-time authorization decision by an authorizing third party, the computer system comprising a processor and a memory device in communication with the processor, the computer system in communication with a payment card processing network, the computer system configured to:

receive, from a plurality of computing devices of a plurality of requesting parties, scoring request messages each associated with a candidate transaction initiated by a customer, each scoring request message including transaction data for the candidate transaction;

create, for each scoring request message, an internal message object;

invoke, for each internal message object, a transform service, wherein the transform service determines a message transformation plug-in corresponding to one of the plurality of scoring models;

generate, for each internal message object using the corresponding message transformation plug-in, a parsed transaction data object corresponding to the expected data input format of the corresponding scoring model, wherein the parsed transaction data object includes at least a portion of the transaction data and is added to the internal message object;

invoke, for each internal message object subsequent to adding the parsed transaction data object, an execution plan builder, wherein the execution plan builder generates an execution plan for the candidate transaction and adds the execution plan to the internal message object, wherein the execution plan specifies the corresponding scoring model;

invoke, for each internal message object subsequent to adding the execution plan, the scoring model specified by the execution plan, wherein the scoring model operates on the transaction data included in the parsed transaction data object and returns a fraud score;

enrich, for each transaction, the transaction data by adding the fraud score to the transaction data; and transmit, for each transaction, the enriched transaction data to the authorizing third party for making the real-time authorization decision.

9. The computer system of claim 8 further configured to store, for each transaction, the transaction data in an in-memory data grid.

10. The computer system of claim 9, wherein storing the transaction data in the in-memory data grid further comprises storing the transaction data including at least one of financial transaction data, healthcare transaction data, and personal identity transaction data.

11. The computer system of claim 9, wherein storing the transaction data in the in-memory data grid further comprises storing financial transaction data including an account number and is associated with a purchase made by a cardholder using a payment card.

12. The computer system of claim 9, wherein storing the transaction data in the in-memory data grid further comprises storing the transaction data in one of an in-memory object grid and an in-memory database.

13. The computer system of claim 9, wherein storing the transaction data in the in-memory data grid further comprises storing the transaction data received from an input channel including at least one of an interchange network, and a web-based network such as the Internet.

14. The computer system of claim 8, wherein invoking the scoring model further comprises retrieving, from the in-memory data grid, at least one of historical transaction data associated with a payment card, summarized historical trends in the historical transaction data, results of off-line analytic analysis associated with a transaction data element and issuer specific preferences specified by an issuer of the payment card.

15. One or more non-transitory computer-readable storage media having computer-executable instructions embodied thereon, wherein when executed by at least one processor, the computer-executable instructions cause the at least one processor to:

receive, from a plurality of computing devices of a plurality of requesting parties, scoring request messages each associated with a candidate transaction initiated by a customer, each scoring request message including transaction data for the candidate transaction;

create, for each scoring request message, an internal message object;

invoke, for each internal message object, a transform service, wherein the transform service determines a message transformation plug-in corresponding to one of a plurality of scoring models;

generate, for each internal message object using the corresponding message transformation plug-in, a parsed transaction data object corresponding to an expected data input format of the corresponding scoring model, wherein the parsed transaction data object includes at least a portion of the transaction data and is added to the internal message object;

invoke, for each internal message object subsequent to adding the parsed transaction data object, an execution plan builder, wherein the execution plan builder generates an execution plan for the candidate transaction and adds the execution plan to the internal message object, wherein the execution plan specifies the corresponding scoring model;

invoke, for each internal message object subsequent to adding the execution plan, the scoring model specified by the execution plan, wherein the scoring model operates on the transaction data included in the parsed transaction data object and returns a fraud score;

enrich, for each transaction, the transaction data by adding the fraud score to the transaction data; and transmit, for each transaction, the enriched transaction data to an authorizing third party for making a real-time authorization decision.

16. The computer-readable storage media of claim 15 further configured to store, for each transaction, the transaction data in an in-memory data grid.

17. The computer-readable storage media of claim 16, wherein storing the transaction data in the in-memory data grid further comprises storing the transaction data including at least one of financial transaction data, healthcare transaction data, and personal identity transaction data.

18. The computer-readable storage media of claim 16, wherein storing the transaction data in the in-memory data grid further comprises storing financial transaction data including an account number and is associated with a purchase made by a cardholder using a payment card.

19. The computer-readable storage media of claim 16, wherein storing the transaction data in the in-memory data grid further comprises storing the transaction data in one of an in-memory object grid and an in-memory database.

\* \* \* \* \*